US010732282B2

(12) United States Patent
Lepere et al.

(10) Patent No.: US 10,732,282 B2
(45) Date of Patent: Aug. 4, 2020

(54) AMBIGUITY COMPENSATION IN TIME-OF-FLIGHT RANGING

(71) Applicant: Trimble AB, Danderyd (SE)

(72) Inventors: Gregory Lepere, Danderyd (SE); Guillaume David, Noisy-le-Grand (FR)

(73) Assignee: Trimble AB, Danderyd (SE)

( * ) Notice: Subject to any disclaimer, the term of this patent is extended or adjusted under 35 U.S.C. 154(b) by 343 days.

(21) Appl. No.: 15/782,071

(22) Filed: Oct. 12, 2017

(65) Prior Publication Data
US 2018/0031704 A1    Feb. 1, 2018

Related U.S. Application Data

(63) Continuation of application No. 14/445,895, filed on Jul. 29, 2014, now Pat. No. 9,804,263.

(30) Foreign Application Priority Data

Sep. 9, 2013    (FR) ...................................... 13 02082

(51) Int. Cl.
*G01S 17/10* (2020.01)
*G01S 17/42* (2006.01)

(52) U.S. Cl.
CPC .............. *G01S 17/10* (2013.01); *G01S 17/42* (2013.01)

(58) Field of Classification Search
CPC ...................................................... G01C 3/08
See application file for complete search history.

(56) References Cited

U.S. PATENT DOCUMENTS

| 3,897,150 A | * | 7/1975 | Bridges ................... G01S 17/10 356/5.04 |
| 4,901,073 A | * | 2/1990 | Kibrick ................ G01D 5/2457 341/13 |
| 9,804,263 B2 | | 10/2017 | Lepere et al. |
| 2006/0238742 A1 | * | 10/2006 | Hunt ....................... G01S 7/483 356/5.15 |

(Continued)

OTHER PUBLICATIONS

U.S. Appl. No. 14/445,895 Non-Final Office Action dated Feb. 7, 2017, 8 pages.

(Continued)

*Primary Examiner* — Luke D Ratcliffe
(74) *Attorney, Agent, or Firm* — Kilpatrick Townsend & Stockton LLP

(57) ABSTRACT

Methods and apparatus are provided for measuring distance from an instrument origin to each of a plurality of points in an environment. Laser pulses are emitted along a measurement axis at successive displacements about the origin. The emission time of each pulse is time-shifted relative to a fixed rate. The time shift corresponds to an index of a repetitive sequential pattern. Received pulses are detected at respective arrival times. For each received pulse: a current apparent distance is determined, a measured delta distance is calculated, a range interval is assigned by comparing measured delta distance with an expected delta distance synchronized with the index of the latest emitted pulse, the current apparent distance is defined to be a true measured distance for any received pulse assigned to a first time interval, otherwise the current apparent distance is defined to be a false measured distance.

20 Claims, 26 Drawing Sheets

(56) References Cited

U.S. PATENT DOCUMENTS

2009/0185159 A1* 7/2009 Rohner ............... G01S 17/89
356/5.01
2011/0116072 A1* 5/2011 Rousseau ............ G01S 7/4818
356/4.07

OTHER PUBLICATIONS

U.S. Appl. No. 14/445,895 Notice of Allowance dated Jun. 26, 2017, 5 pages.

* cited by examiner

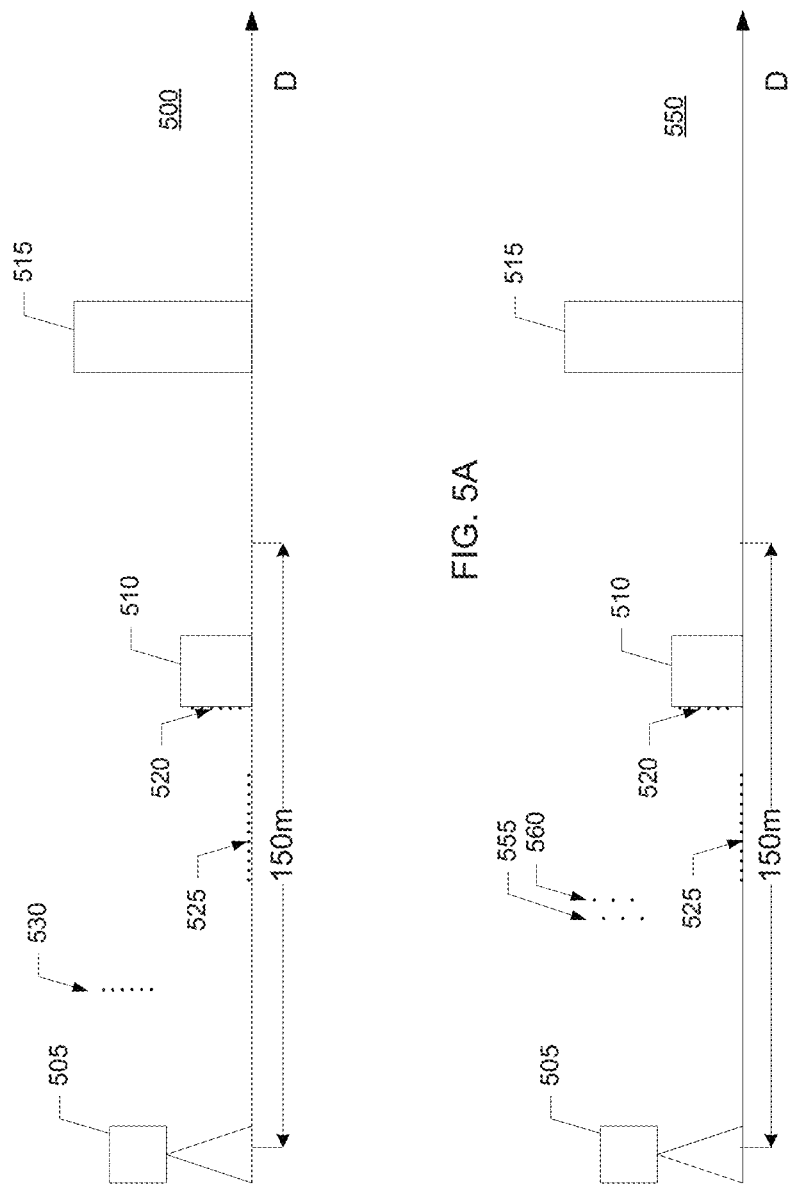

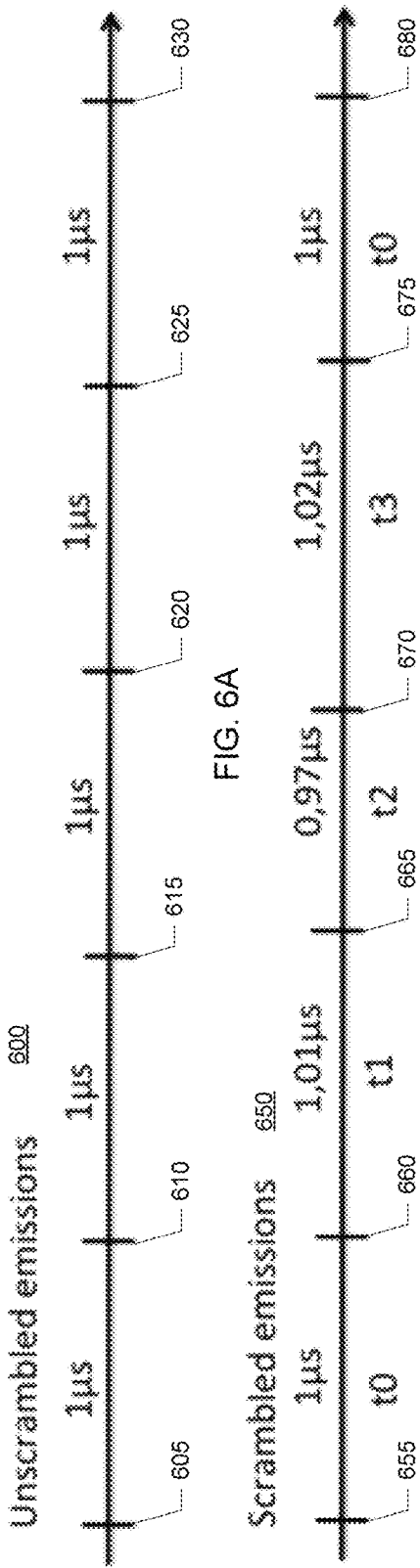

Intervals

- The interval range is (lightspeed/2)/emission rate
  – Interval 0 goes from 0m to first interval range
  – Interval 1 goes from first interval range to second
  – Interval 2 goes from second interval range to third
  – ...

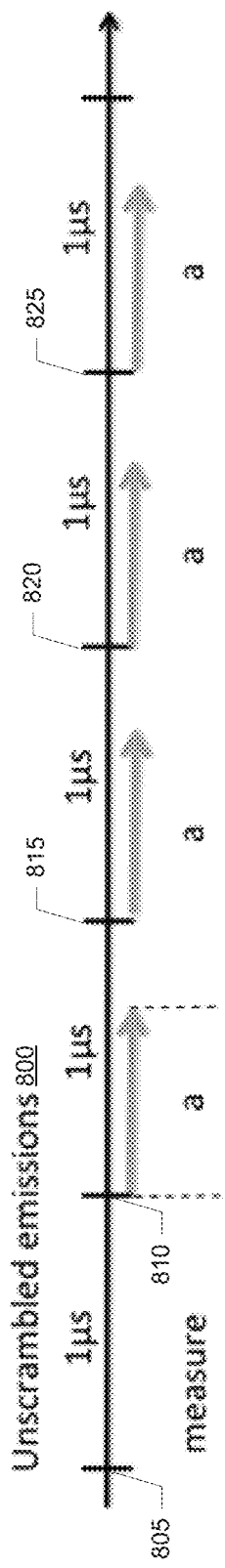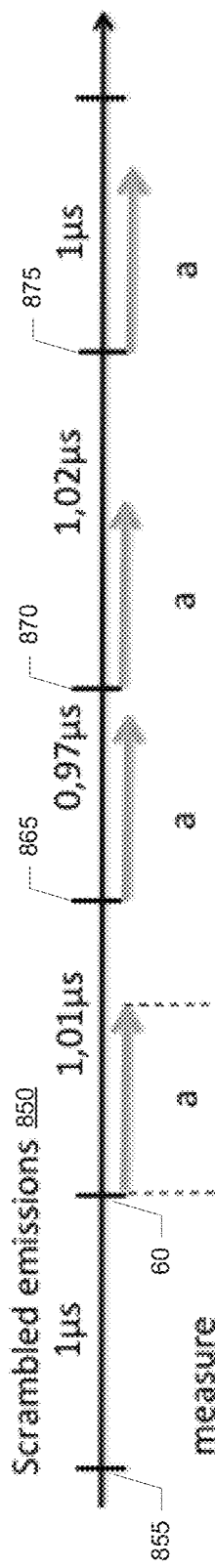

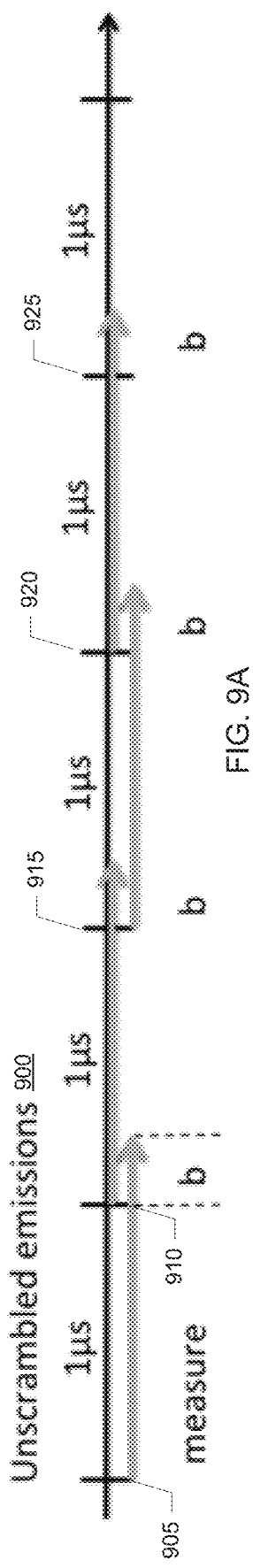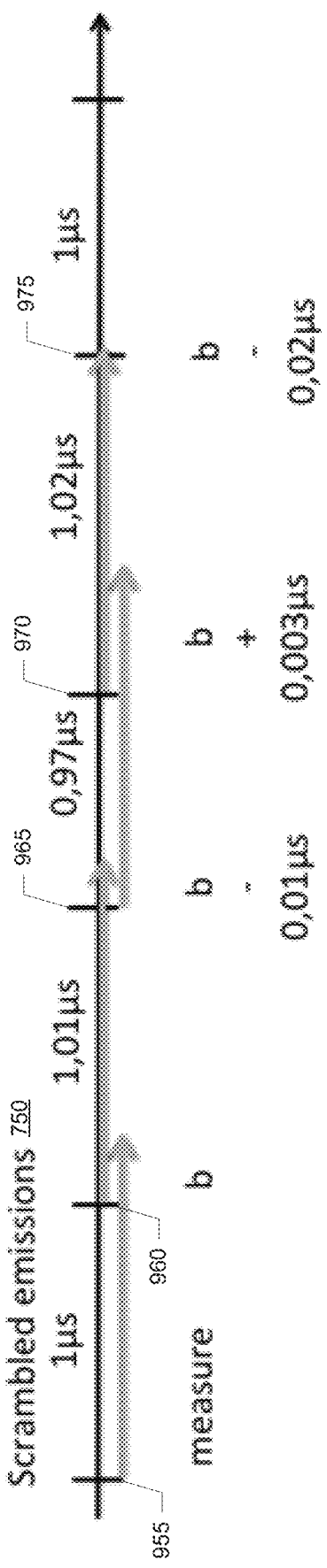
FIG. 9A
FIG. 9B

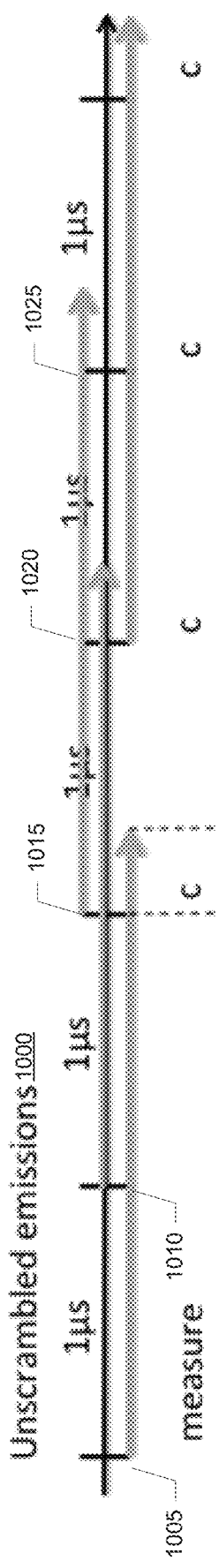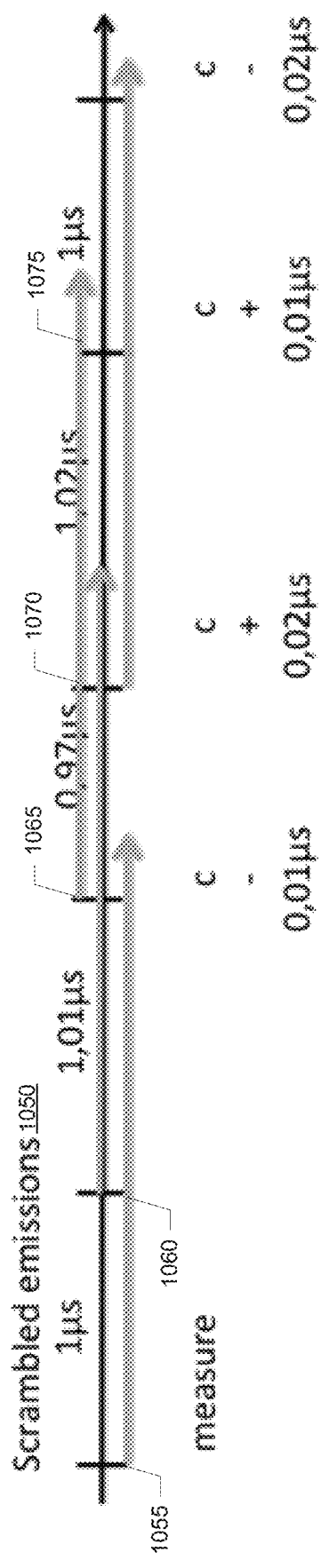
FIG. 10A
FIG. 10B

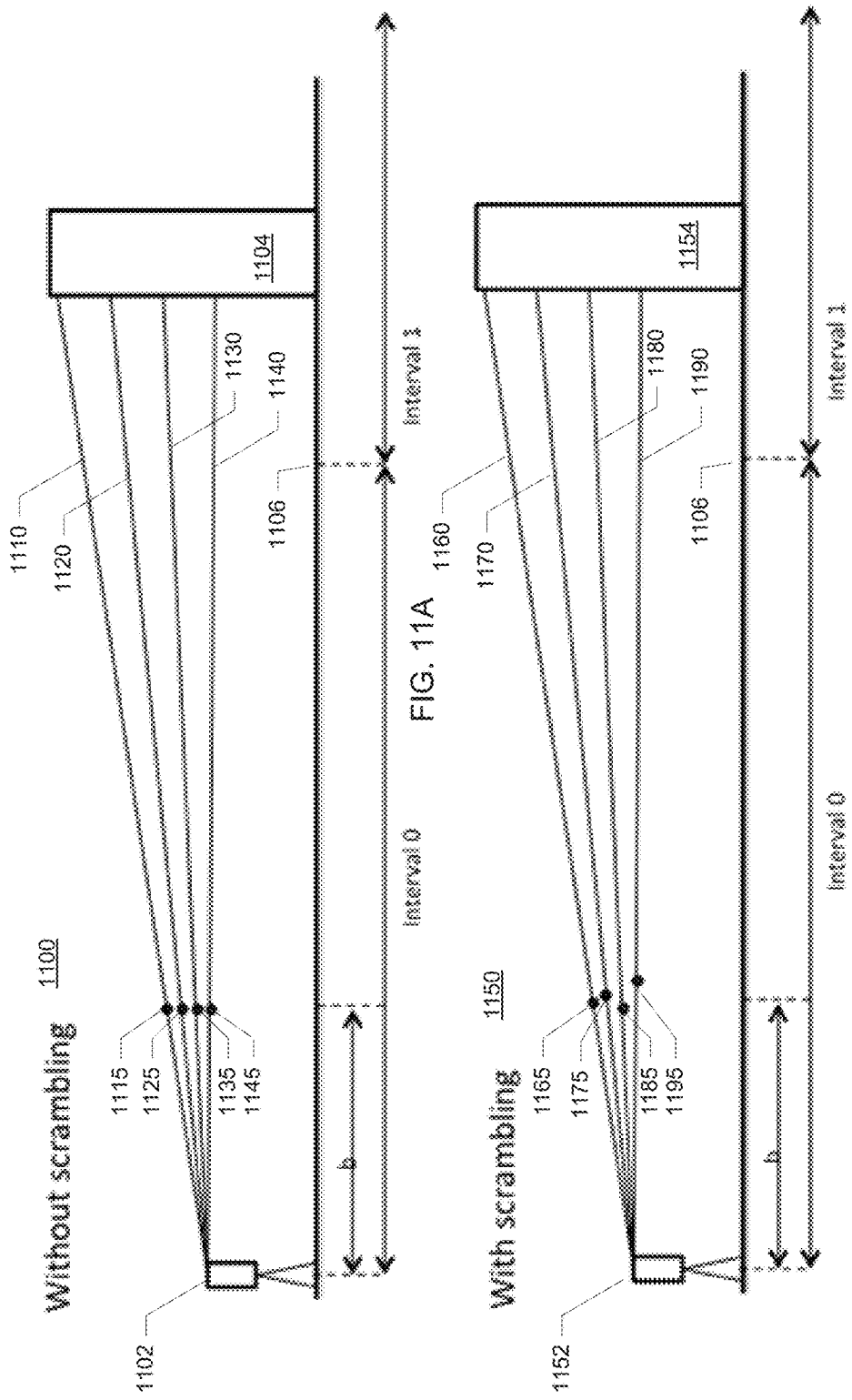

Okay, but we don't know 'b' or 'c'!

- So we will remove them by subtracting two consecutive measures.

- For example:
  - $[(b-0,01\mu s)-(b)] = -0,01\mu s$
  - $[(b+0,03\mu s)-(b-0,01\mu s)] = 0,04\mu s$
  - $[(b-0,02\mu s)-(b+0,03\mu s)] = -0,05\mu s$
  - $[(b)-(b-0,02\mu s)] = 0,02\mu s$

- By just changing the sign, we find the table for interval 1!

FIG. 12

Identification of Interval

Real time point tagging

- A point p is tagged if:
  - signed delta distance(p-1, p) corresponds to one of the delta tables
  - p-1 is missed and p+1 is tagged
  - p-1 and p+1 are tagged
  - p is missed and p-1 is tagged

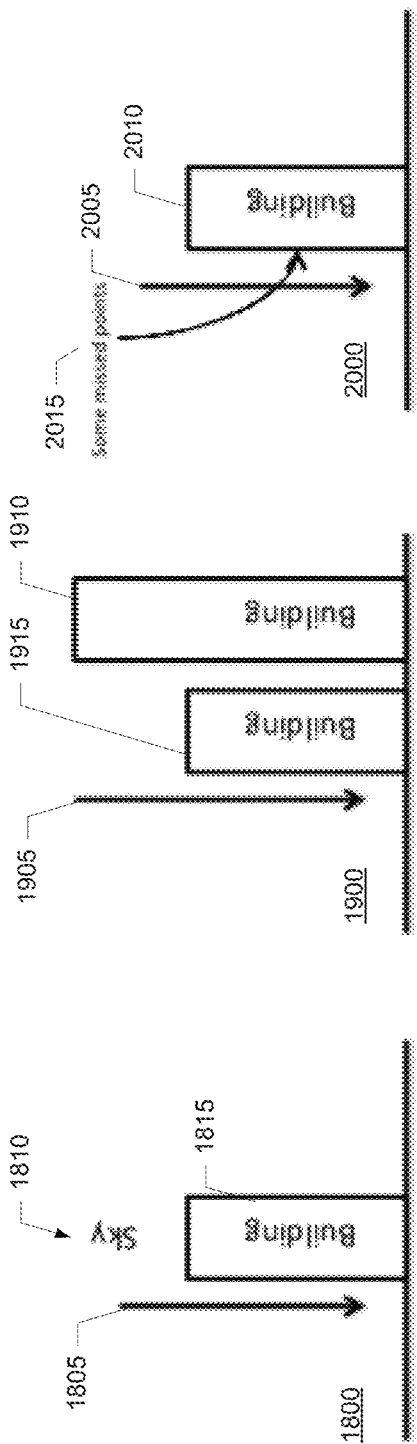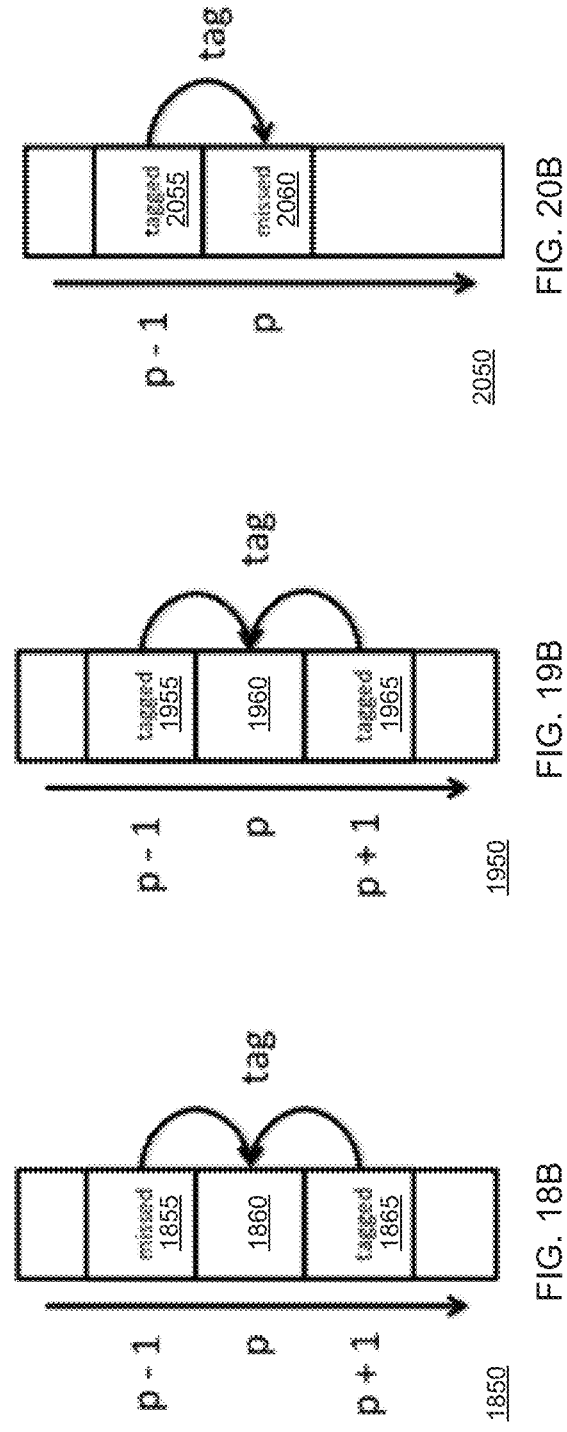

Extensions

- The initial algorithm fits well for walls and continuous surfaces.
  - The tag contagion can also consider the measured distances to restrict its contamination.
  - Another extension is to make an additional horizontal scrambling

2D extension
Interval assignment policy

Each measure is compared to at least one other of the neighborhood.
Each comparison ends with a interval assignment.
A strategy of collaboration of the interval assignments brings a resulting assignment for the evaluated measure For example, a policy of resulting interval assignment can be one of the following:
- The furthest interval assignment
- The most represented assignment
- The median of assignments
- A weighting based on the angular distance from the evaluated measure

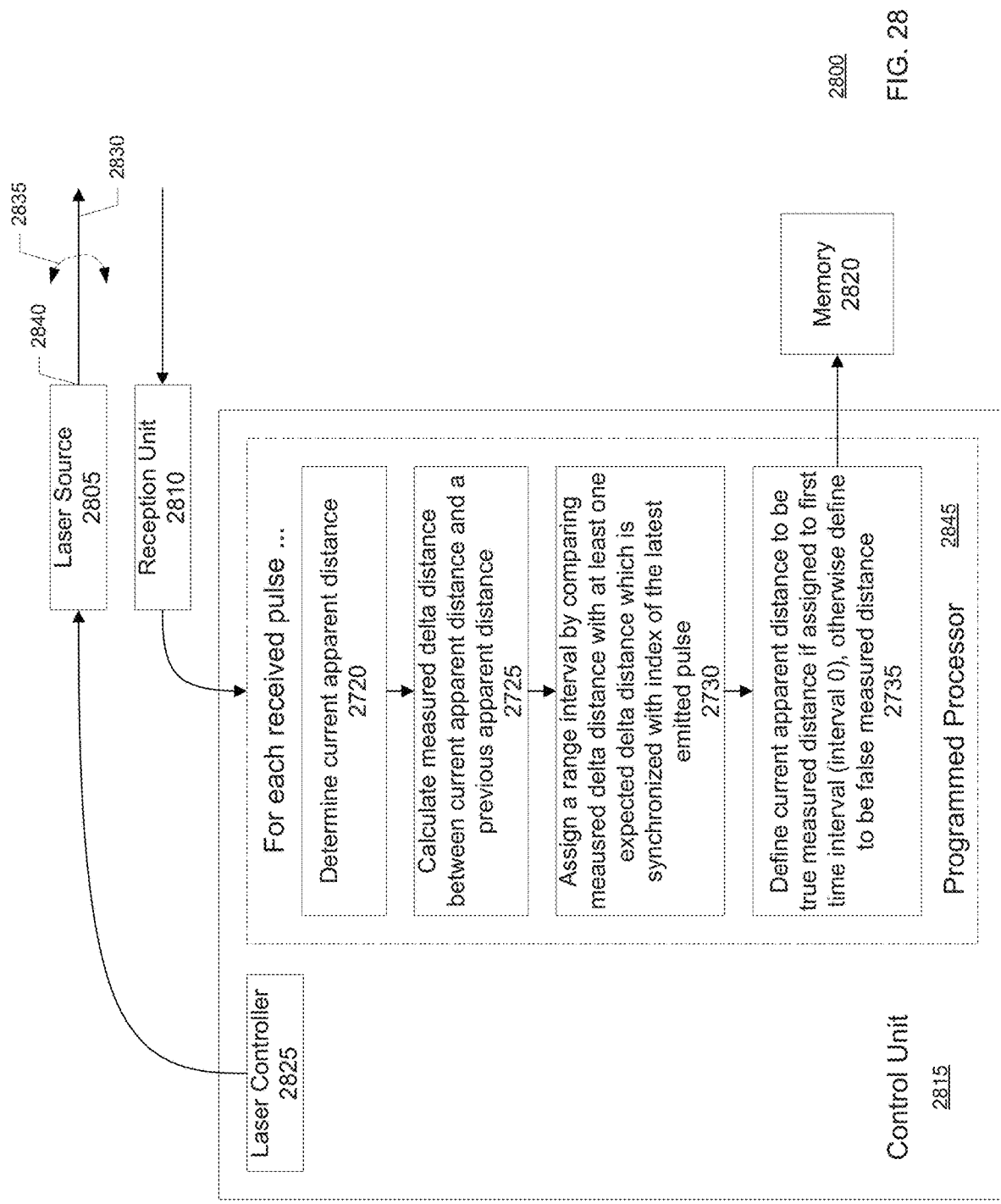

AMBIGUITY COMPENSATION IN TIME-OF-FLIGHT RANGING

CROSS-REFERENCE TO RELATED APPLICATIONS

This application is a continuation of U.S. application Ser. No. 14/445,895, filed Jul. 29, 2014 which claims priority to French Patent Application No. FR 13/02082, filed Sep. 9, 2013, each of which is incorporated herein by reference in their entirety for all purposes.

TECHNICAL FIELD

The present invention relates to the field of electronic distance measurement. More particularly, the present invention relates to methods and apparatus for compensating ambiguity in time-of-flight ranging.

BACKGROUND ART

Ambiguity interval limitation is a classic issue for distance measurement techniques.

For distance measurement based on phase shift, the issue has been addressed by using different frequencies of amplitude modulation: a lower frequency for resolving ambiguity, and a higher frequency for accuracy.

In time-of-flight distance measurement, the delay between emission time of an emitted laser pulse and detection time of a return pulse allows for distance calculation. When the measurement rate is high (e.g., 1 MHz), the time between emitted pulses is short, (e.g., 1 µs), so that the return pulse from a first emitted pulse can return after a second emitted pulse or even a third emitted pulse has been sent. This ambiguity makes it unclear whether a return pulse corresponds to the first, second or third emitted pulse.

If distance is measured between the emission time of a given emitted pulsed and the detection time of a return pulse resulting from a former emitted pulse, then the measured distance is diminished by a multiple of the ambiguity interval limit (e.g., ~150 m for 1 µs of light traveling duration). So for example, a building at 193 m would be incorrectly measured at 43 m. Incorrectly measured distances result in three-dimensional point measurements which interfere with other, correct measurements (e.g., when measurements are displayed as a point cloud), with no easy way to filter or separate the incorrect measurements from the correct measurements.

In aerial scanning, where the variation of measured distances is small relative to the measurement range, the issue can be addressed by time windowing. See, for example, International Patent Publication WO 2008/107129 A1 dated 12 Sep. 2008, and U.S. Pat. No. 8,212,998 B2 dated 3 Jul. 2012. The system can expect a return pulse within a measurement window: a reasonable assumption for airborne LIDAR where the distance to be measured is always between two limits given by the flight altitude and the possible ground variations. This method is not suitable for terrestrial laser scanning where measured distances vary from the minimum to the maximum possible measurement range.

One solution for terrestrial scanning is to apply pulse signatures to the emitted pulses. See for example International Patent Publication WO 2009/039875 dated 2 Apr. 2009, and U.S. Pat. No. 8,149,391 dated 3 Apr. 2012. Applying pulse signatures makes it possible to distinguish pulses from one another. Recognizing the order of emitted pulses in a sequence enables the return pulses to be sorted in correct order. Pulses can be "signed" in different ways, such as by emitting a doublet of pulses for each distance measurement with the time (and thus the distance) between the two pulses of the doublet varying according to a defined sequence. The signature is recognized as the time between a pair of received pulses. The pulse signature approach has the disadvantage of implementation complexities, such as generating doublets, differentiating doublets from one another, and recognizing the signature from a noisy return doublet.

Additional ranging techniques are described in Patent Application Publication US 2010/0128248 A1 dated 27 May 2010, Patent Application Publication US 2011/0038442 A1 dated 17 Feb. 2011, European Patent Application Publication EP 2 469 297 A1 dated 27 Jun. 2012, Patent Application Publication US 2012/0257186 dated 11 Oct. 2013, and European Patent Application Publication EP 1 413 896 A2 dated 28 Apr. 2004.

Simple and effective techniques to address the ambiguity interval limitation are desired, especially techniques useful for terrestrial scanning.

SUMMARY

Electronic distance measurement methods and apparatus enabling time-of-flight ranging with ambiguity resolution are provided in accordance with embodiments of the present invention. Distance ambiguity is compensated in time-of-flight measurement with a high measurement rate (e.g., of 1 MHz) or a medium measurement rate (e.g., of 400 kHz). In some embodiments, incorrect measurements made at a range above a first ambiguity interval limit (e.g., ~150 m for 1 MHz measurement rate or ~340 m for 400 kHz measurement rate) are identified. These measurements are filtered out or corrected for the ambiguity.

Methods and apparatus are provided for measuring distance from an instrument origin to each of a plurality of points in an environment. Laser pulses are emitted along a measurement axis at successive displacements about the origin. The emission time of each pulse is time-shifted relative to a fixed rate. The time shift corresponds to an index of a repetitive sequential pattern. Received pulses are detected at respective arrival times. For each received pulse: a current apparent distance is determined, a measured delta distance is calculated, a range interval is assigned by comparing measured delta distance with an expected delta distance synchronized with the index of the latest emitted pulse, the current apparent distance is defined to be a true measured distance for any received pulse assigned to a first time interval, otherwise the current apparent distance is defined to be a false measured distance.

Embodiments of the invention are based on a principle of scrambling the point cloud for distances above the ambiguity limit by having an irregular pulse repetition rate.

BRIEF DESCRIPTION OF DRAWING FIGURES

These and other aspects and features of the present invention will be more readily understood from the embodiments described below with reference to the drawings, in which:

FIG. 1 schematically illustrates a system for implementing a distance measurement scheme in accordance with some embodiments of the invention;

FIG. 2 schematically illustrates elements of a system for implementing a distance measurement scheme in accordance with some embodiments of the invention.

FIG. 3 schematically illustrates a system for implementing a distance measurement scheme in accordance with some embodiments of the invention;

FIG. 5A illustrates a scenario in which the emission times of measurement pulses are maintained at a fixed repetition rate;

FIG. 5B illustrates a scenario in which the emission times of measurement pulses are scrambled in accordance with some embodiments of the invention;

FIG. 6A is a timeline showing pulses emitted periodically without scrambling;

FIG. 6B is a timeline showing pulses whose emission times are scrambled in accordance with some embodiments of the invention;

FIG. 6C is a table showing delta distance for each index in a second interval in accordance with some embodiments of the invention;

FIG. 6D is a table showing delta distance for each index in a third interval in accordance with some embodiments of the invention;

Figure 13:
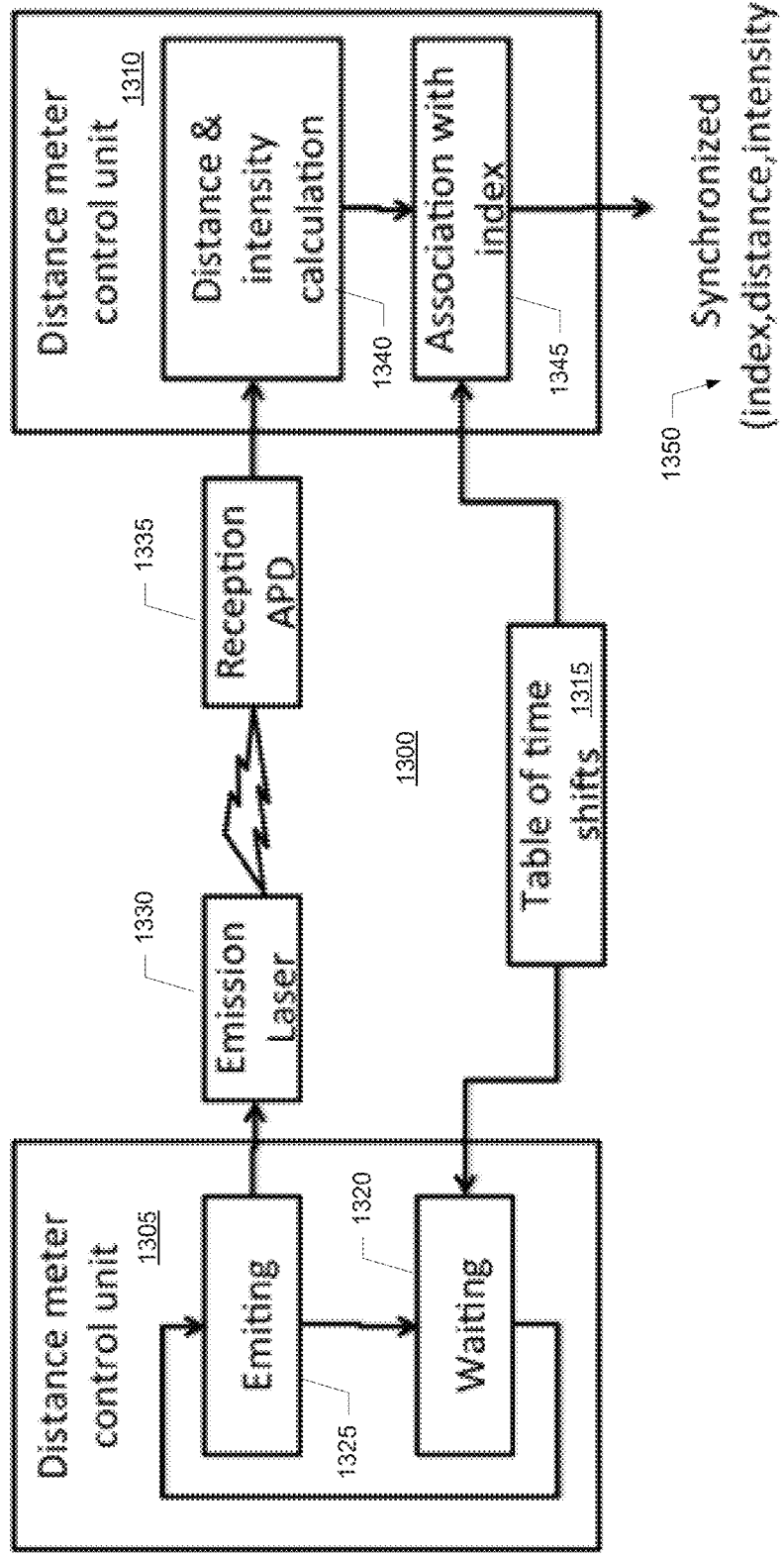
Figure 14:
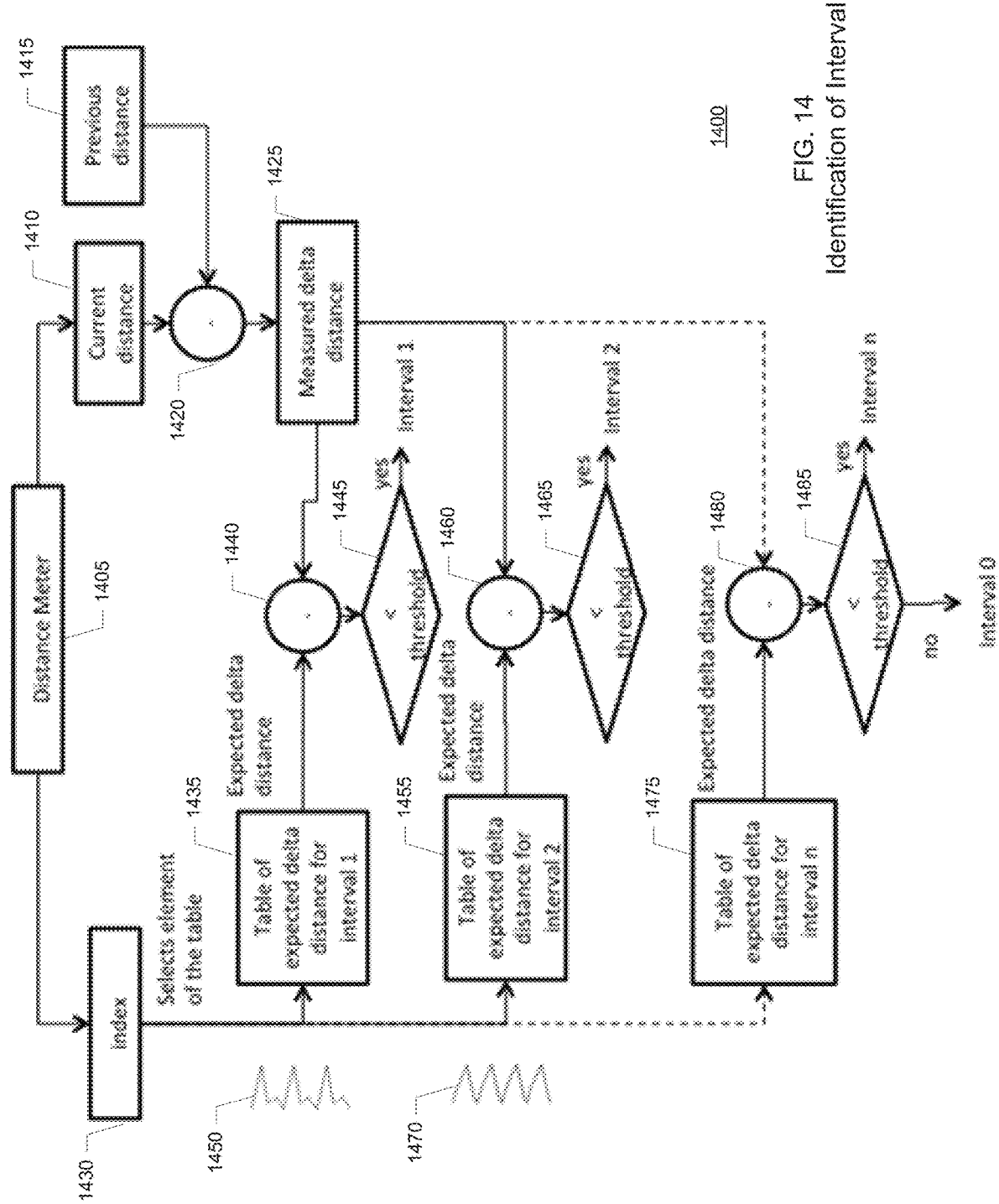
Figure 15:
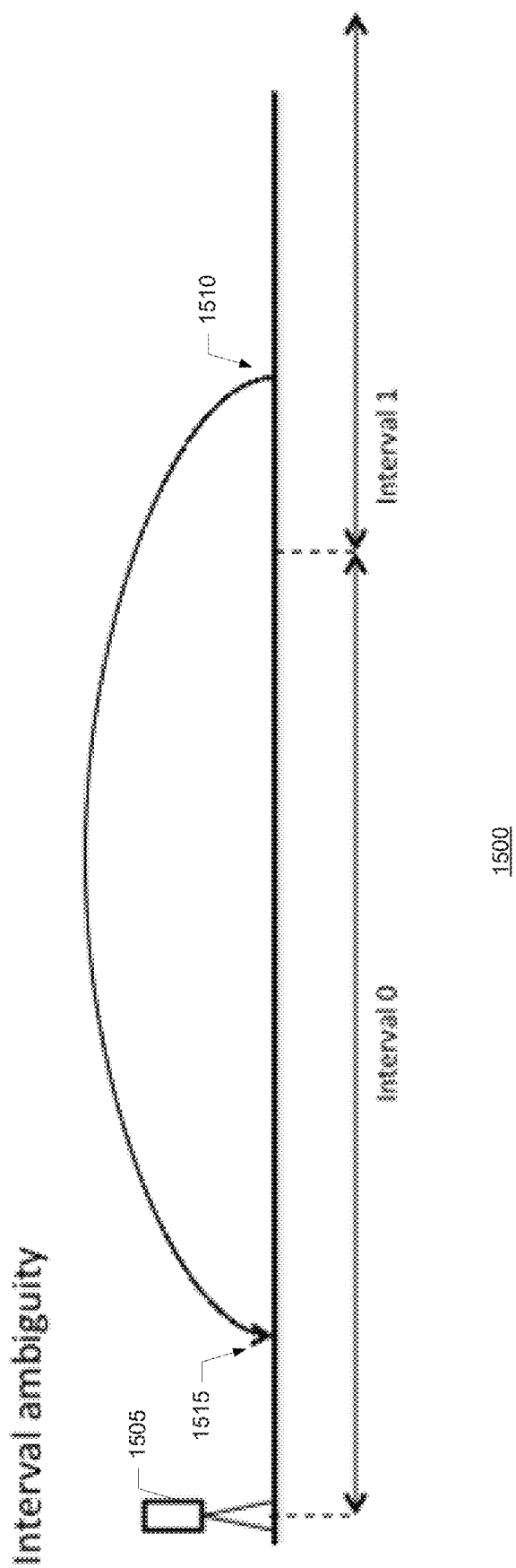
Figure 16:
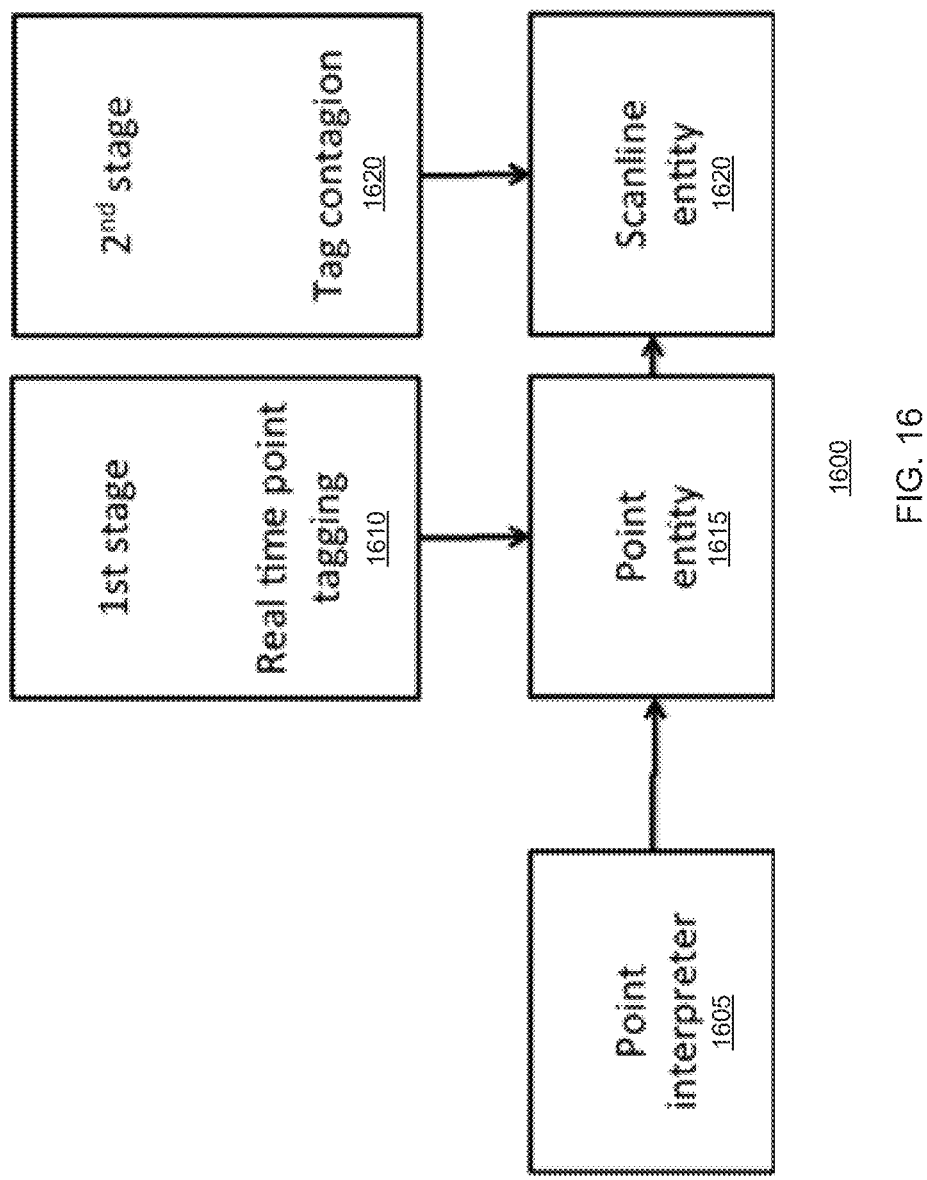
Figure 21:
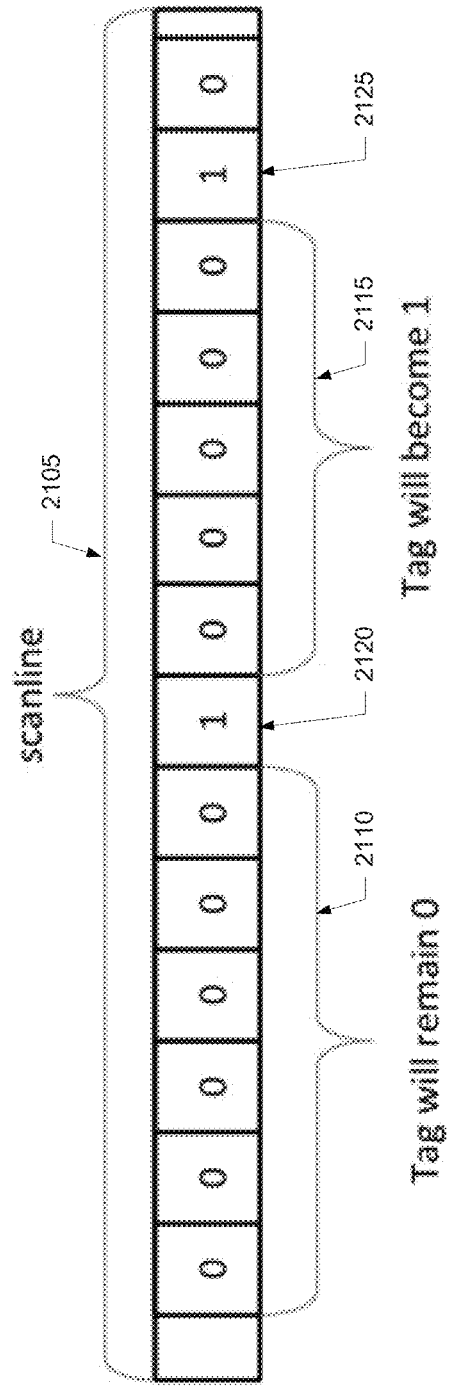
Figure 22:
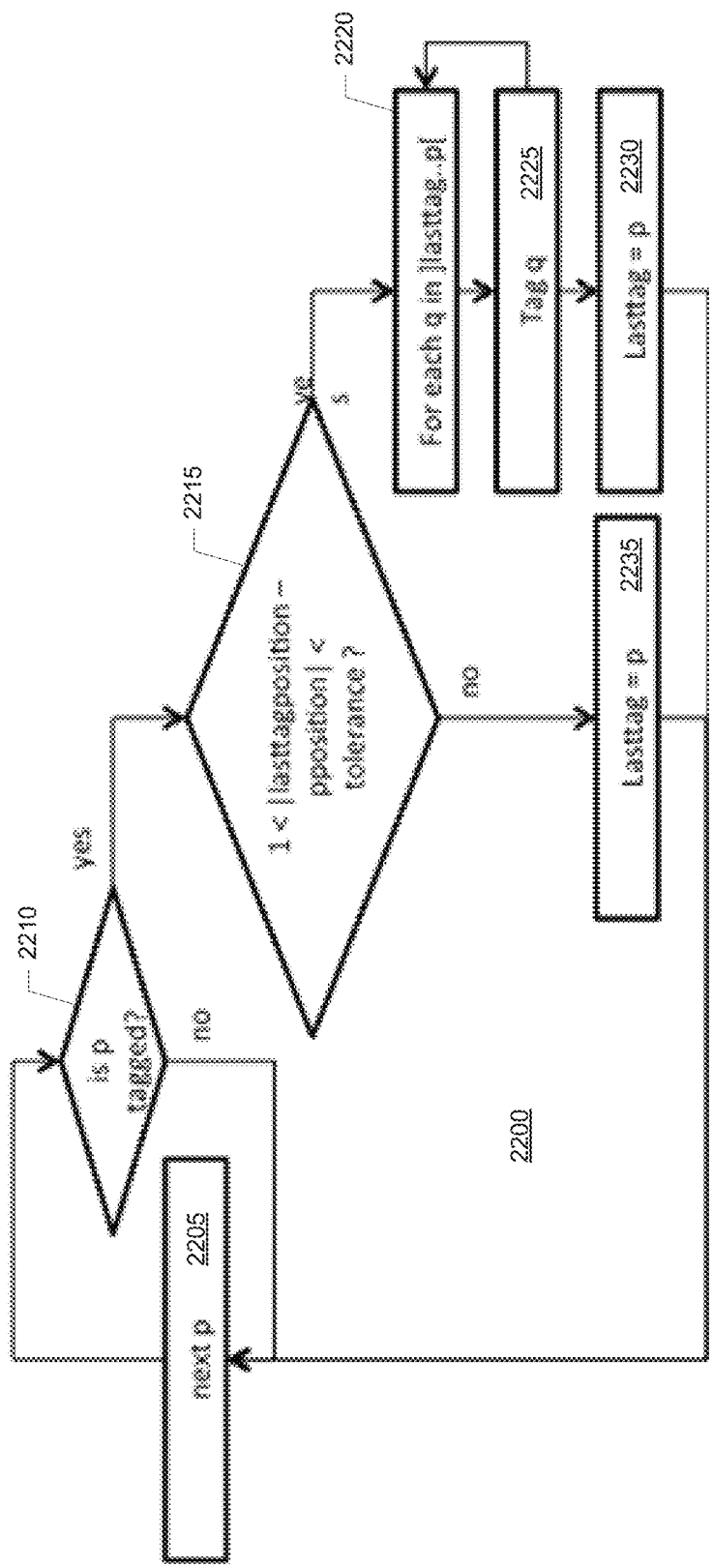
Figure 24:
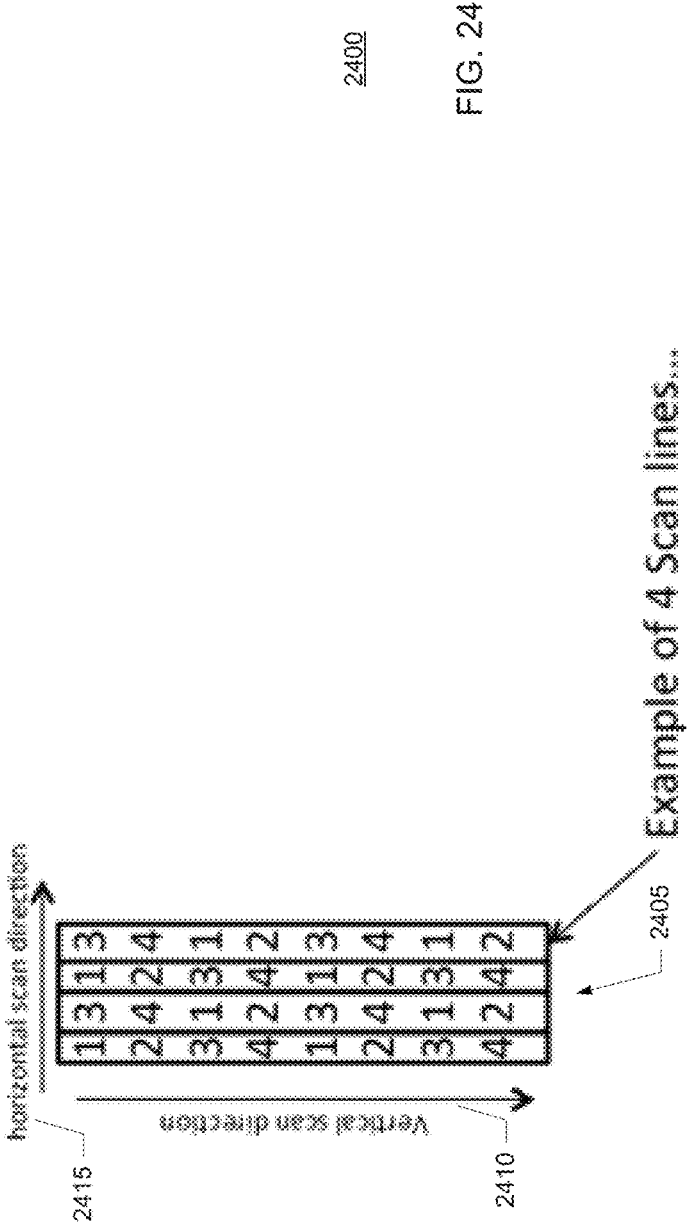
Figure 25:
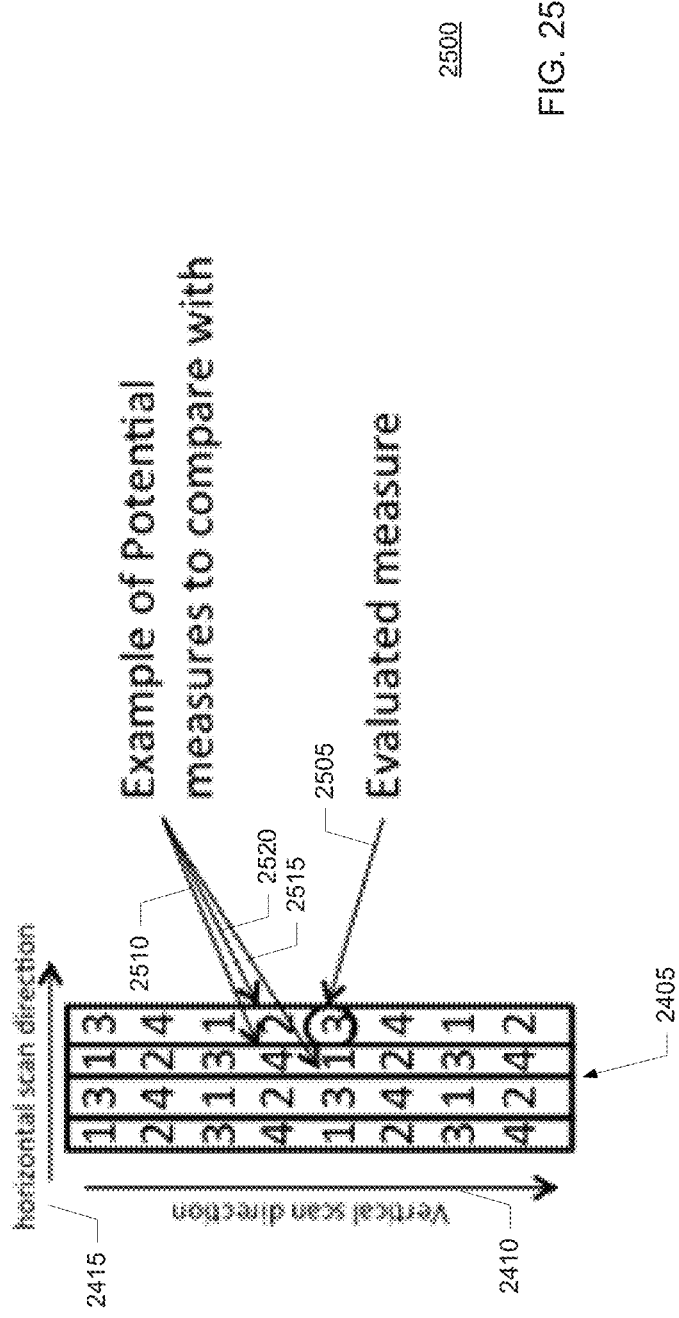
Figure 27:
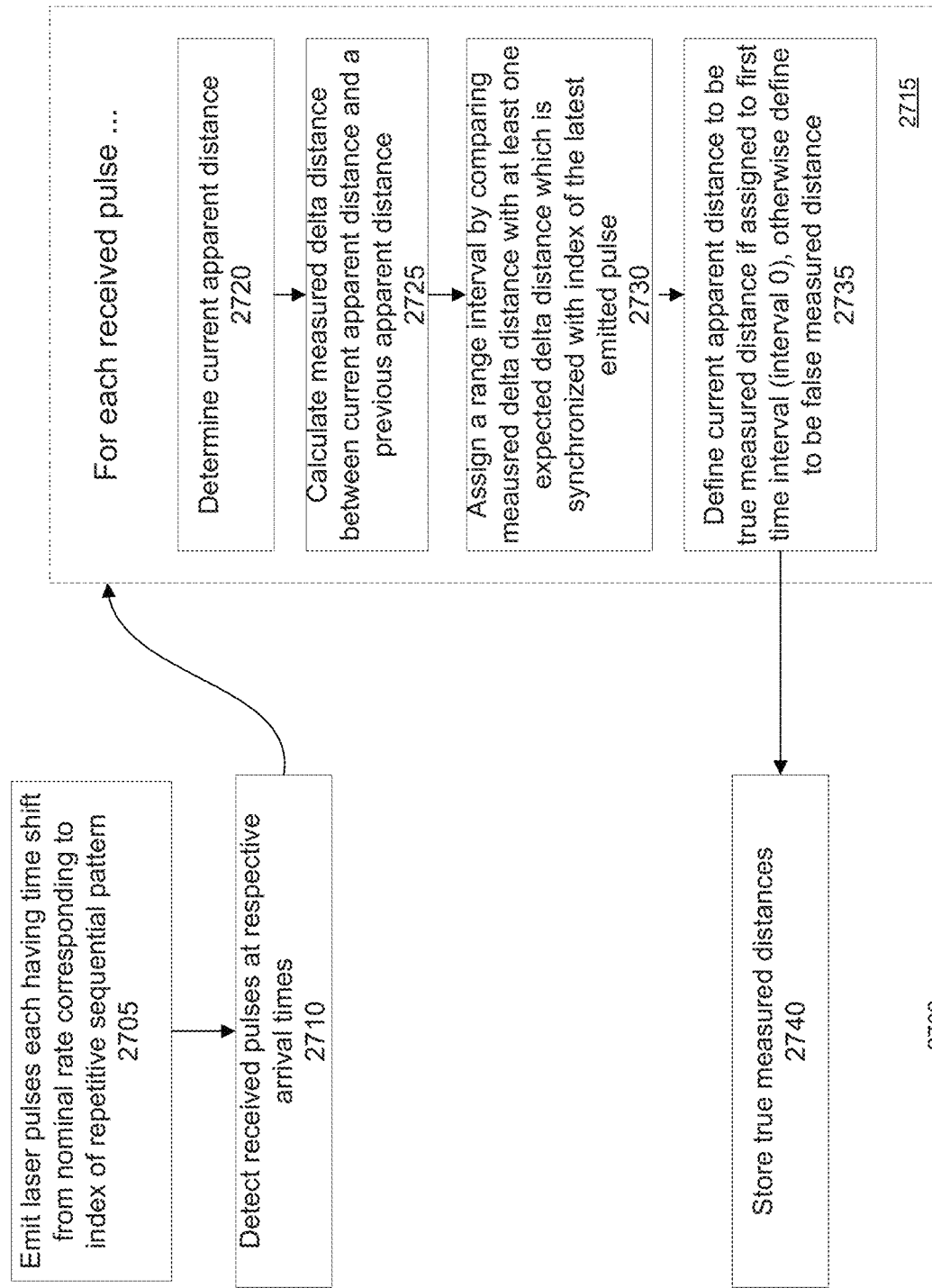

FIG. 7 indicates how an interval range is obtained for each of a plurality of intervals in accordance with some embodiments of the invention;

FIG. 8A is a timeline showing the result of measurements in a first interval, using pulses emitted periodically without scrambling;

FIG. 8B is a timeline showing the result of measurements in a first interval, using pulses whose emission times are scrambled in accordance with some embodiments of the invention;

FIG. 9A is a timeline showing the result of measurements in a second interval, using pulses emitted periodically without scrambling;

FIG. 9B is a timeline showing the result of measurements in a second interval, using pulses whose emission times are scrambled in accordance with some embodiments of the invention;

FIG. 10A is a timeline showing the result of measurements in a third interval, using pulses emitted periodically without scrambling;

FIG. 10B is a timeline showing the result of measurements in a third interval, using pulses whose emission times are scrambled in accordance with some embodiments of the invention;

FIG. 11A schematically illustrates measurements in a second interval, using pulses emitted periodically without scrambling;

FIG. 11B schematically illustrates measurements in a second interval, using pulses whose emission times are scrambled in accordance with some embodiments of the invention;

FIG. 12 shows a method of identifying that measurements are in a second interval, in accordance with some embodiments of the invention;

FIG. 13 illustrates the measurement of distances with pulses whose emission times are scrambled in accordance with some embodiments of the invention;

FIG. 14 illustrates identification of measurement interval in accordance with some embodiments of the invention;

FIG. 15 shows an example of interval ambiguity;

FIG. 16 shows an overview of point tagging in accordance with some embodiments of the invention;

FIG. 17 shows point-tagging rules in accordance with some embodiments of the invention;

FIG. 18A shows a scanning scenario;

FIG. 18B shows an example of point tagging in the scenario of FIG. 18A in accordance with some embodiments of the invention;

FIG. 19A shows a scanning scenario;

FIG. 19B shows an example of point tagging in the scenario of FIG. 19A in accordance with some embodiments of the invention;

FIG. 20A shows a scanning scenario;

FIG. 20B shows an example of point tagging in the scenario of FIG. 20A in accordance with some embodiments of the invention;

FIG. 21 shows tag contagion in accordance with some embodiments of the invention;

FIG. 22 is a flow chart of point tagging in accordance with some embodiments of the invention;

FIG. 23 describes extensions in accordance with some embodiments of the invention;

FIG. 24 illustrates two-dimensional scrambling of the emission times of measurement pulses in accordance with some embodiments of the invention;

FIG. 25 illustrates two-dimensional signature recognition in accordance with some embodiments of the invention;

FIG. 26 describes two-dimensional interval assignment in accordance with some embodiments of the invention;

FIG. 27 shows a method of measuring distance in accordance with some embodiments of the invention; and FIG. 28 schematically shows a system for measuring distance in accordance with some embodiments of the invention.

DETAILED DESCRIPTION

Figure 1:
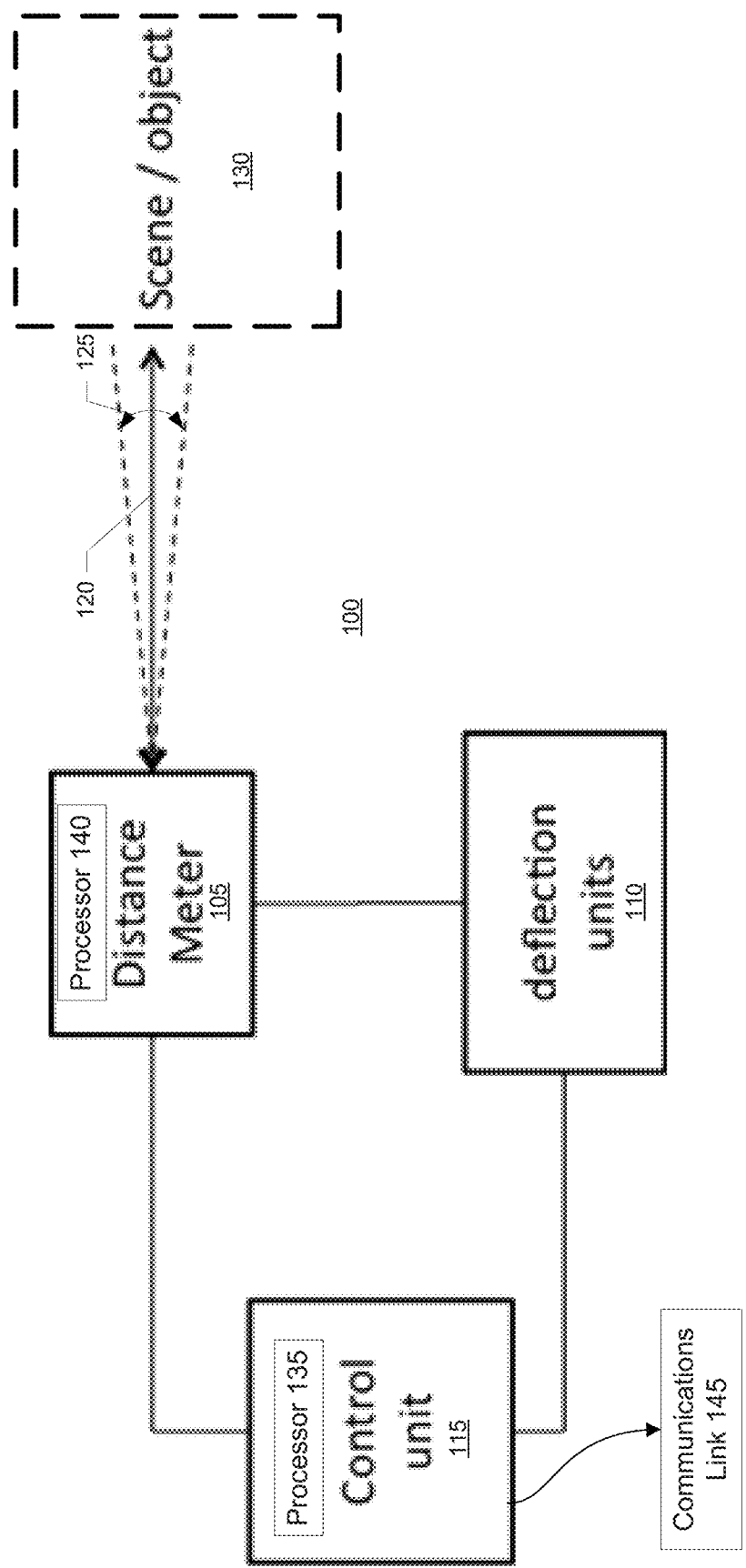

FIG. 1 schematically illustrates a scanner system 100 for implementing a distance measurement scheme in accordance with some embodiments of the invention. System 100 includes a distance meter 105, one or more deflection units 110, and a system control unit 115. Distance meter 105 emits laser pulses along a path 120, which is deflected over a scan angle 125 by deflection unit/s 110. Distance meter 105 detects laser pulses returning from a scene or object 130 and determines a measured distance based on time of flight of each pulse. System control unit 115 and/or distance meter 105 can include one or more processors 135, 140 programmed to carry out functions described herein. System 100 can also have a communications link 145 to enable exchange of data with an external processor (not shown) programmed to carry out functions described herein.

A scanner system used on a moving vehicle can have a single deflection unit 110 to scan the laser path 120 about a vehicle path. A stationary scanner system can have two deflection units 110, each scanning the laser path about one of two orthogonal axes.

Figure 2:
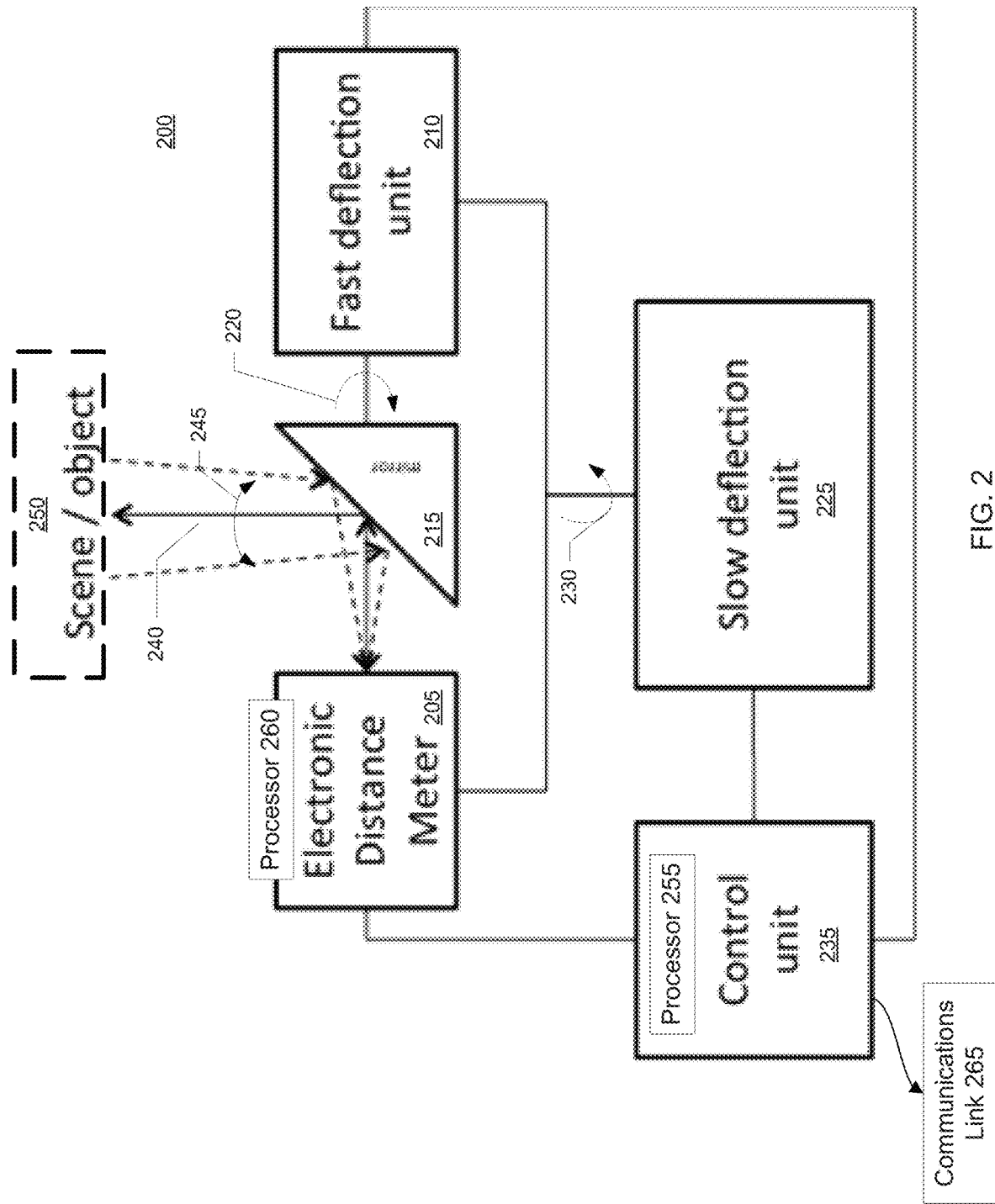

FIG. 2 schematically illustrates elements of a scanner system 200 for implementing a distance measurement scheme in accordance with some embodiments of the invention. System 200 includes a distance meter 205, a fast deflection unit 210 rotating a mirror 215 about a first axis 220, a slow deflection unit rotating mirror 215 about a second axis 230, and a system control unit 235. Distance meter 205 emits laser pulses along a path 240, which is deflected over a scan angle 245 by deflection units 210 and 225. Distance meter 205 detects laser pulses returning from a scene or object 250 and determines a measured distance based on time of flight of each pulse.

Axis 220 can lie substantially in a horizontal plane so that rotation of mirror 215 about axis 220 scans the path 240 in a substantially vertical plane. Axis 230 can lie substantially in a vertical plane so that rotation of mirror 215 about axis 230 rotates the path 240 azimuthally. Scanner 200 is suited for stationary scanning of a scene or object 250. The result of a scan is a cloud of measurement points in a spherical coordinate system centered on the intersection of axis 220 and axis 230.

System control unit 235 and/or distance meter 205 can include one or more processors 255, 260 programmed to carry out functions described herein. System 200 can also have a communications link 265 to enable exchange of data with an external processor (not shown) programmed to carry out functions described herein.

Figure 3:
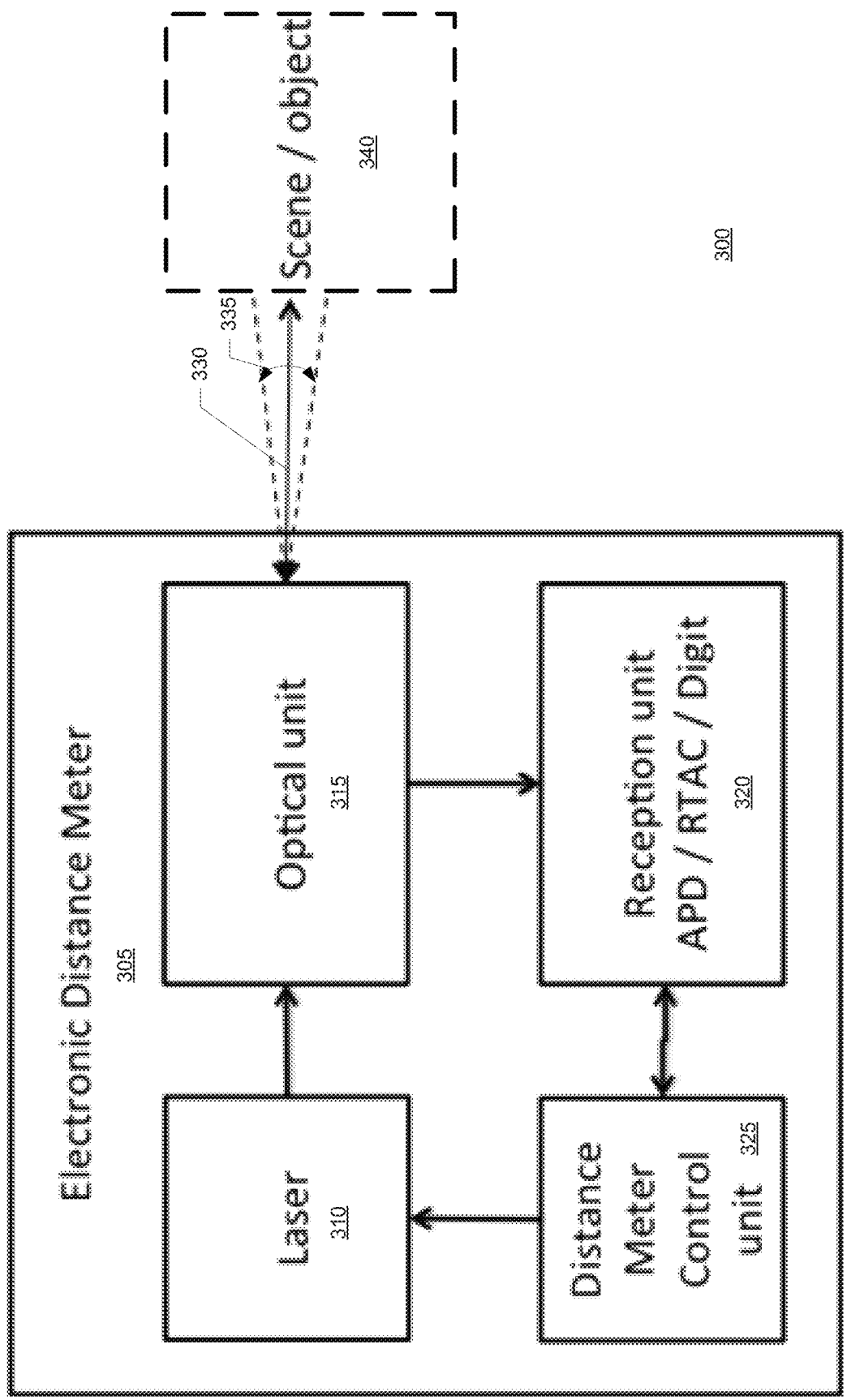

FIG. 3 schematically illustrates at 300 a distance meter 305 for implementing a distance measurement scheme in accordance with some embodiments of the invention. Distance meter 305 can be used as distance meter 105 of system 100 or as distance meter 205 of system 200. Distance meter 305 has a source 310 of laser pulses, an optical unit 315, a reception unit 320, and a distance-meter control unit 325. Optical unit 315 directs laser pulses from source 310 along path 330, and directs return pulses from scene or object 340 to reception unit 320. Reception unit 320 includes, for example, an avalanche photodiode (APD), a high-speed pulse detector circuit (RTAC) and a digitizer. Distance meter 305 can be as described, for example, in International Publication Number WO 2009/039875 A1 and U.S. Pat. No. 8,149,391 B2, which are incorporated herein by this reference.

Figure 4A:
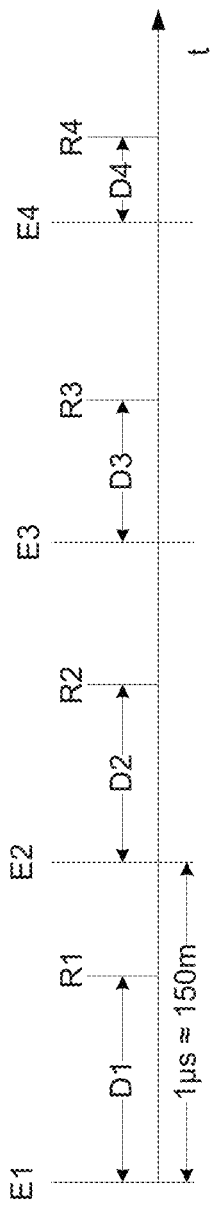
FIG. 4A is a timeline of a distance-measurement scenario.

FIG. 4A is a timeline of a distance-measurement scenario, in which each return pulse (R1, R2, R3, . . . ) is detected by the distance meter before a new pulse is emitted (E2, E3, E4, . . . ). In this example, return pulse R1 corresponds to emitted pulse E1 and results in a measured distance D1, return pulse R2 corresponds to emitted pulse E2 and results in a measured distance D2, return pulse R3 corresponds to emitted pulse E3 and results in a measured distance D3, and return pulse R4 corresponds to emitted pulse E4 and results in a measured distance D4. For a measurement rate of 1 MHz the period of pulse emission is 1 μs, corresponding to a distance of about 150 m. In this example, all distances (D1, D2, D3, D4) are measured correctly because they are less than 150 m. (While the example given here is for a measurement rate of 1 MHz, other embodiments have a different measurement rate. For example, a measurement rate of 400 kHz corresponds to a 2.5 μs period of pulse emission and a distance of about 375 m.)

Figure 4B:
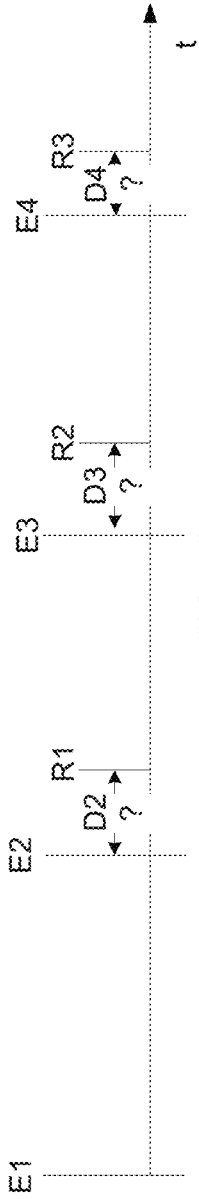
FIG. 4B is a timeline of a further distance-measurement scenario.

FIG. 4B is a timeline of a further distance-measurement scenario, in which it is not known which return pulse (R1, R2, R3, . . . ) detected by the distance meter corresponds to which emitted pulse (E2?, E3?, E4?, . . . ). In this example, return pulse R1 corresponds to emitted pulse E1, but because it is received after emission of emitted pulse E2 there is an ambiguity as to whether it corresponds to emitted pulse E1 or emitted pulse E2; the measured distance will appear to be D2 (less than 150 m) rather than the true distance (greater than 150 m). Similarly, return pulse R2 corresponds to emitted pulse E2, but because it is received after emission of emitted pulse E3 there is an ambiguity as to whether it corresponds to emitted pulse E2 or emitted pulse E3; the measured distance will appear to be D3 (less than 150 m) rather than the true distance (greater than 150 m). Likewise, return pulse R3 corresponds to emitted pulse E3, but because it is received after emission of emitted pulse E4 there is an ambiguity as to whether it corresponds to emitted pulse E3 or emitted pulse E4; the measured distance will appear to be D4 (less than 150 m) rather than the true distance (greater than 150 m). All distances (D1, D2, D3) are greater than 150 m and are measured incorrectly as being less than 150 m. However, measured distances D1, D2, D3 are diminished by the period of pulse emission (1 μs, corresponding to a distance of about 150 m), and are still geometrically consistent with one another.

Figure 4C:
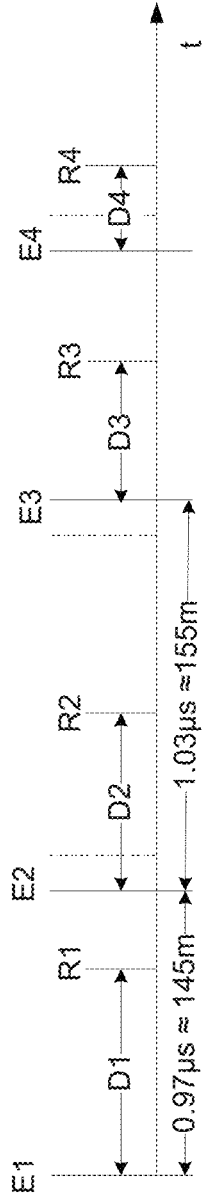
FIG. 4C is a timeline of a distance-measurement scenario in accordance with some embodiments of the invention.

FIG. 4C is a timeline of a distance-measurement scenario in accordance with some embodiments of the invention. In this example, pulse emission times of the pulses are varied from a nominal 1 μs period (indicated by dotted vertical lines) such that pulse E2 is emitted 0.97 μs after pulse E1 (corresponding to about 145 m) and pulse E3 is emitted 1.03 μs after pulse E2 (corresponding to about 155 m). In this example, return pulse R1 corresponds to emitted pulse E1 and results in a measured distance D1, return pulse R2 corresponds to emitted pulse E2 and results in a measured distance D2, return pulse R3 corresponds to emitted pulse E3 and results in a measured distance D3, and return pulse R4 corresponds to emitted pulse E4 and results in a measured distance D4. In this example, all distances (D1, D2, D3, D4) are measured correctly because in each case the return pulse arrives before emission of the next emitted pulse, e.g., the measured distances are correct if are they are less than 145 m-155 m. The slightly irregular pulse emission rate does not affect the measured distances in this example.

Figure 4D:
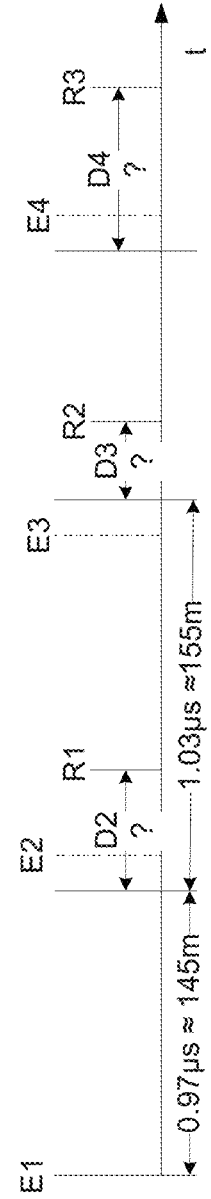
FIG. 4D is a timeline of a distance-measurement scenario in accordance with some embodiments of the invention.

FIG. 4D is a timeline of a distance-measurement scenario in accordance with some embodiments of the invention. In this example (as in FIG. 4C), pulse emission times of the pulses are varied from a nominal 1 μs period (indicated by dotted vertical lines) such that pulse E2 is emitted 0.97 μs after pulse E1 (corresponding to about 145 m) and pulse E3 is emitted 1.03 μs after pulse E2 (corresponding to about 155 m). In this example, return pulse R1 resulting from emitted pulse E1 arrives after emission of pulse E2, so that the apparent measured distance D2 is based on emitted pulse E2. Similarly, return pulse R2 resulting from emitted pulse E2 arrives after emission of pulse E3, so that the apparent measured distance D3 is based on emitted pulse E3, and return pulse R3 resulting from emitted pulse E3 arrives after emission of pulse E4, so that the apparent measured distance D4 is based on emitted pulse E4. In this example, measured distances D2, D3, D4 are incorrect (as in FIG. 4B), except that D2 and D4 are diminished by 155 m while D3 is diminished by 145 m. Unlike the example of FIG. 4B, measured distance D3 is not geometrically consistent with measured distances D2 and D4.

FIG. 5A schematically illustrates a scenario 500 in which the emission times of measurement pulses are maintained at a fixed repetition rate, as in the examples of FIG. 4A and FIG. 4B. A scanner system 505 scans a scene having a building 510 in a first interval of less than 150 m and a building 515 in a second interval of 150 m-300 m. Points 520 represent correct measurements on the face of building 510. Points 525 represent correct measurements on a ground surface between scanner system 505 and building 510. Points 530 represent incorrect measurements of points on the face of building 515, which appear as "ghost" points at a range of less than 150 m because of the ambiguity illustrated in FIG. 4B.

FIG. 5B schematically illustrates a scenario in which the emission times of measurement pulses are varied (scrambled), as in the examples of FIG. 4C and FIG. 4D. In this example, scanner system 505 scans a scene having a building 510 in a first interval of less than 150 m and a building 515 in a second interval of 150 m-300 m. Points 520 represent correct measurements on the face of building 510. Points 525 represent correct measurements on a ground surface between scanner system 505 and building 510. Points 555 and points 560 represent incorrect measurements of points on the face of building 515, which appear as "ghost" points at a range of less than 150 m because of the ambiguity illustrated in FIG. 4D. In this example, points 555 and 560 are staggered (rather than vertically aligned as points 530) due to the variation of pulse emission times illustrated in FIG. 4D.

Points measured at a range above the ambiguity interval are not easy to identify (and thus to remove) because they look like normal points.

Some embodiments of the invention make the "ghost" points (incorrectly measured points) look like parasitic points and thereby allow them to be identified and removed from the point cloud. By applying a small variation in the pulse repetition rate from one pulse to another, measured distances below the ambiguity interval limit are not affected, but measured distances above the ambiguity interval limit have a varying bias.

FIG. 6A is a timeline showing pulses emitted periodically without scrambling. In this example, pulses are emitted with a fixed 1 µs period at times 605, 610, . . . , 630.

FIG. 6B is a timeline showing pulses whose emission times are scrambled in accordance with some embodiments of the invention. In this example, pulses are emitted with a nominal 1 µs period, but with a varying bias, at times 655, 660, . . . , 680. The delay $t_0$ between emission times 655 and 660 is 1 µs, the delay $t_1$ between emission times 660 and 665 is 1.01 µs, the delay $t_2$ between emission times 665 and 670 is 0.97 µs, and the delay $t_3$ between emission times 670 and 675 is 1.02 µs. The pattern then repeats, so that the delay $t_0$ between emission times 675 and 680 is 1 µs, etc.

Measured distances over a first interval (interval 0) up to about 150 m is unaffected by the variation of pulse emission times. Measured distances over a second interval (interval 1) of about 150 m-300 m are biased by the variation of pulse emission times. Measured distances over a third interval (interval 2) of about 300 m-450 m are biased by the variation of pulse emission times.

FIG. 6C is a table 685 showing delta distance for each index in a second interval in accordance with some embodiments of the invention. For index 0, the time difference $t_1-t_0=10$ ns. For index 1, the time difference $t_2-t_1=-40$ ns. For index 2, the time difference $t_3-t_2=50$ ns. For index 3, the time difference $t_0-t_3=-20$ ns. The time difference for each index in the table of FIG. 6C is unique. The bias pattern repeats after four pulses in this example.

FIG. 6D is a table 690 showing delta distance for each index in a third interval in accordance with some embodiments of the invention. For index 0, the time difference $t_2-t_0=-30$ ns. For index 1, the time difference $t_3-t_1=10$ ns. For index 2, the time difference $t_0-t_2=30$ ns. For index 3, the time difference $t_1-t_3=-10$ ns. The time difference for each index in the table of FIG. 6D is unique. Also, the time difference for each index in the tables of FIG. 6C and FIG. 6D are different.

FIG. 7 indicates how an interval range is obtained for each of a plurality of intervals in accordance with some embodiments of the invention. The interval range is determined by Interval Range=(speed of light/2)/emission rate such that interval 0 is from 0 m to the first interval range, interval 1 is from the first interval range to the second interval range, interval 2 is from the second interval range to the third interval range, etc.

FIG. 8A is a timeline showing the result of measurements in a first interval (interval 0), using pulses emitted periodically without scrambling. In this example, the pulse emission times are spaced at 1 µs. Measured distances a are all correct because they are within interval 0.

FIG. 8B is a timeline showing the result of measurements in a first interval (interval 0), using pulses whose emission times are varied in accordance with some embodiments of the invention. In this example, the pulse emission times are varied as in FIG. 6B. Measured distances a are all correct because they are within interval 0.

FIG. 9A is a timeline showing the result of measurements in a second interval (interval 1), using pulses emitted periodically without scrambling. In this example, the pulse emission times are spaced at 1 µs. Measured distances b are all incorrect because they are within interval 1; the correct distance should be b+interval 0.

FIG. 9B is a timeline showing the result of measurements in a second interval (interval 1), using pulses whose emission times are scrambled in accordance with some embodiments of the invention. In this example, the pulse emission times are spaced as in FIG. 6B. Measured distances b are all incorrect because they are within interval 1, and are biased by the index values of FIG. 6C.

FIG. 10A is a timeline showing the result of measurements in a third interval (interval 2), using pulses emitted periodically without scrambling. In this example, the pulse emission times are spaced at 1 µs. Measured distances c are all incorrect because they are within interval 2; the correct distance should be c+interval 0+interval 1.

FIG. 10B is a timeline showing the result of measurements in a third interval (interval 2), using pulses whose emission times are scrambled in accordance with some embodiments of the invention. In this example, the pulse emission times are spaced as in FIG. 6B. Measured distances c are all incorrect because they are within interval 2, and are biased by the index values of FIG. 6D.

FIG. 11A schematically illustrates distance measurements in a second interval (interval 1), using pulses emitted periodically without scrambling. Scanning system 1102 scans the face of a building 1104 lying within interval 1. Measurement along path 1110 appears as measured distance 1115, measurement along path 1120 appears as measured distance 1125, measurement along path 1130 appears as measured distance 1135, and measurement along path 1140 appears as measured distance 1145. Measured distances 1115, 1125, 1135 and 1145 are at a nominal range b within interval 0, while the true distances lie within interval 1.

FIG. 11B schematically illustrates measurements in a second interval, using pulses whose emission times are scrambled in accordance with some embodiments of the invention. Scanning system 1152 scans the face of a building 1154 lying within interval 1. Measurement along path 1160 appears as measured distance 1165, measurement along path 1170 appears as measured distance 1175, measurement along path 1180 appears as measured distance 1185, and measurement along path 1190 appears as measured distance 1195. Measured distances 1165, 1175, 1185 and 1195 are at a nominal range b within interval 0, while the true distances lie within interval 1, but the measured distances are biased by the variation of emission times of the respective measurement pulses.

FIG. 12 shows a method of identifying that measurements are in a second interval, in accordance with some embodiments of the invention. In this example, subtracting consecutive distance measurements recovers the index values of the table of FIG. 6C for interval 1. The measured distances which incorrectly appear to be at a nominal range b within interval 0 can thus be recognized as belonging to interval 1.

FIG. 13 illustrates at 1300 the measurement of distances with pulses whose emission times are scrambled in accordance with some embodiments of the invention. Distance meter control unit section 1305 and section 1310 access a table of time shifts 1315. A delay or advance corresponding to the table is applied at 1320 to the nominal pulse emission time so that emission of pulses is controlled at 1325 to introduce the desired bias pattern to pulses emitted at 1330. Return pulses received at reception unit 1335 are correlated with emitted pulses to calculate a measured distance and intensity at 1340. Each measured distance is associated at 1345 with an index value derived from table 1315, e.g., an index value of table 6C. Each measurement thus has an associated index value, measured distance and intensity as indicated at 1350.

FIG. 14 illustrates at 1400 a method of identification of measurement interval in accordance with some embodiments of the invention. A distance meter 1405 of a scanning system provides a current measured distance 1410. Current measured distance 1410 is differenced with a previous measured distance 1415 at 1420 to obtain a measured delta distance 1425. Distance meter 1405 increments a pointer to index 1430 which retrieves an element from a table 1435 of expected delta distance for interval 1. Table 1435 is as shown, for example, in FIG. 6C. The expected delta distance for interval 1 is differenced with measured delta distance 1425 at 1440. If the result of differencing at 1440 is determined at 1445 to be less than a threshold value, the current measured distance is deemed to be within interval 1. The pattern of expected biases of interval 1 is shown at 1450.

Index 1430 also retrieves an element from a table 1455 of expected delta distance for interval 2. Table 1455 is as shown, for example, in FIG. 6D. The expected delta distance for interval 2 is differenced with measured delta distance 1425 at 1460. If the result of differencing at 1460 is determined at 1465 to be less than a threshold value, the current measured distance is deemed to be within interval 2. The pattern of expected biases of interval 2 is shown at 1470, and differs from the pattern 1450 of interval 1.

Index 1430 also retrieves an element from a table 1475 of expected delta distance for interval n. Table 1475 is comparable to those shown, for example, in FIG. 6C and FIG. 6D, for a further distance interval. The expected delta distance for interval n is differenced with measured delta distance 1425 at 1480. If the result of differencing at 1480 is determined at 1485 to be less than a threshold value, the current measured distance is deemed to be within interval n. The pattern of expected biases of interval n is not shown, but differs from the pattern 1450 of interval 1 and the pattern 1470 of interval 2.

If the measured delta distance 1425 is not determined at 1445 to be within interval 1, or at 1465 to be within interval 2, or at 1485 to be within interval n, then it is deemed to be within interval 0.

The method of FIG. 14 can be modified by eliminating table 1475, differencing 1480 and determining 1485, so that identification of interval is limited to interval 1, interval 2 and default interval 0.

The method of FIG. 14 can be modified by eliminating tables 1475 and 1455, differencing 1480 and 1460, and determination 1485 and 1465, so that identification of interval is limited to interval 1 and default interval 0.

FIG. 15 shows at 1500 an example of interval ambiguity for the case of two intervals. A scanning system 1505 measures at a range of 1510 within interval 1, but the measured distance is incorrectly at range 1515 within interval 0 due to measurement ambiguity.

In some embodiments of the invention, the measured distance at range 1515 is determined to be incorrect and is identified as an incorrect measurement so that it can be suppressed and thus not appear (e.g., as a "ghost" point at incorrect range) in a point cloud display.

In some embodiments of the invention, the measured distance at range 1515 is determined to be incorrect and is identified as belonging to interval 1 so that it can be displayed correctly in a point cloud display.

The methods described above have been found to substantially mitigate the effect of measurement distance ambiguity by either suppressing incorrect measurements or reassigning incorrect measurements to their respective correct range intervals. Further mitigation is possible with the addition of "point tagging" as will now be described.

FIG. 16 shows at 1600 an overview of point tagging in accordance with some embodiments of the invention. A point interpreter 1605 carries out two stages of tagging. The first stage 1610 performs substantially real-time point tagging 1615 by evaluating whether the current measured distance fits within a pattern (or "signature") such as pattern 1450 of interval 1 or pattern 1470 of interval 2. The second stage 1620 applies a rule to assign the current measured distance to an interval based on its relationship to nearby prior and/or subsequent measurements ("tag contagion").

FIG. 17 shows point-tagging rules in accordance with some embodiments of the invention. In the first stage 1610, a current measured distance (of point p) is tagged as belonging to an interval if the delta distance corresponds to one of the interval tables. Referring to the example of FIG. 14, a current measured distance 1410 is assigned to interval 1 if the measured delta distance 1425 between the current measured distance 1410 of point p and the measured distance 1415 of prior point p−1 matches the expected delta distance of table 1435 for the index associated with current measured distance 1410. That is, the current measured distance is assigned to interval 1 if the measured delta distance (p−1, p) conforms to the pattern 1450 ("signature") defined in table 1435.

As shown in FIG. 17, the second stage 1620 applies further rules such that a current measured distance of point p is tagged as belonging to an interval if: prior measured distance p−1 is missing and subsequent measured distance p+1 is tagged as belonging to that interval; both prior measured distance p−1 and subsequent measured distance p+1 are tagged as belonging to that interval; current measured distance p is missing and prior measured distance p−1 is tagged as belonging to that interval.

Examples of the application of point tagging will now be described.

FIG. 18A shows a scanning scenario 1800 in which a scanning system (not shown) scans vertically downward as shown by arrow 1805 from the sky 1810 along 5 the face of a building 1815.

FIG. 18B shows at 1850 an example of point tagging in the scenario of FIG. 18A in accordance with some embodiments of the invention. When the sky is scanned, no return is detected by distance meter, e.g., no measured distance p−1 is obtained at 1855. As the scan reaches the upper face of building 1815, a current measured distance p is obtained at

1860. Comparison of current measured distance p with the prior measured distance p−1 is not possible because prior measured distance p−1 is missing.

Current measured distance p is retained, but left untagged until a subsequent measured distance p+1 is obtained at 1865. Where comparison of the difference between measured distance p+1 and measured distance p permits recognition of an interval pattern and assignment of measured distance p+1 to an interval (e.g., interval 1), then the rule is applied to also assign measured distance p to that interval. A single comparison of measured distance p+1 with measured distance p may not be sufficient to recognize an interval pattern, but where comparison of a subsequent measured distance p+2 with measured distance p+1 enables recognition of the pattern, then the rule can be applied to assign measured distance p to the same interval.

FIG. 19A shows a scanning scenario 1900 in which a scanning system (not shown) scans vertically downward as shown by arrow 1905 along the face of a building 1910 and the face of a closer building 1915. Transitions between surfaces lying in different intervals can interfere with recognition of the pattern of an interval.

FIG. 19B shows at 1950 an example of point tagging in the scenario of FIG. 19A in accordance with some embodiments of the invention. Where measured distance p−1 at 1955 and measured distance p+1 at 1965 are both identified as belonging to an interval (e.g., interval 1), then measured distance p lying between them at 1960 is assigned to the same interval.

FIG. 20A shows a scanning scenario 2000 in which a scanning system (not shown) scans vertically downward as shown by arrow 2005 along the face of a building 2010. Some points are missing as indicated at 2015. Missing points can interfere with recognition of the pattern of an interval.

FIG. 20B shows at 2050 an example of point tagging in the scenario of FIG. 20A in accordance with some embodiments of the invention. Where measured distance p is missing at 2060 and measured distance p−1 at 2065 is identified as belonging to an interval (e.g., interval 1), then the missing measured distance p is assigned to the same interval.

FIG. 21 shows at 2100 an example of tag contagion in accordance with some embodiments of the invention. The measured distance of a point p is tagged as belonging to an interval if it lies between two points tagged as belonging to that interval, which are less distant than some number (e.g., 6) of measurement points. For example, scanline 2105 has a series of measured distances missing as indicated by the zeros in the six scan point locations 2110 and a series of measured distances missing in the five scan point locations 2115, and has measured distances present and assigned to interval 1 in the scan point locations 2120 and 2125. Applying the 5 tag contagion rule, the scan point locations 2115 are assigned to interval 1 and the tags of scan point locations 2115 are changed from 0 to 1.

FIG. 22 is a flow chart of a point tagging method 2200 using tag contagion in accordance with some embodiments of the invention. A measured distance p is selected at 2205 and checked at 2210 for a tag identifying the interval to which it is assigned. If a tag is found, then at 2215 a check is made whether the difference between scanline position of the last measured distance having a tag is greater than one and less than a selected number of scanline positions away (e.g., tolerance=6). If yes, then at 2220 each scanline position q within the tolerance from the scanline position of measured distance p is taken in turn and at 2225 assigned a tag associated with the interval of the last measured distance having a tag. When at 2230 the last tagged position is that of measured distance p, the process returns to select a next measured distance p at 2205. If a measured distance p selected at 2205 is not tagged, then the next measured distance p is selected. If at 2215 the difference between scanline position of the last measured distance having a tag not is greater than one and less than a selected number of scanline positions away, then the last tagged position is defined as that of measured distance p.

FIG. 23 describes at 2300 extensions of the inventive concepts. The methods described above have been found well-suited for walls and other continuous surfaces. However, the tag contagion concept can be modified within the scope of the invention to take into account not only the tag identifying the interval to which a measured-distance point is assigned, but also the measured distance; in this way, the contagion can be restricted so that nearby measured distances are assigned to the same interval as the measured distance under consideration only if the difference of the measured distance is within a selected threshold distance.

A further extension of the inventive concepts is to introduce scrambling of the emission times of the measurement pulses not only along each scan line but also across adjacent scan lines, and to use the resulting two-dimensional patterns to associate measured distances with range intervals.

FIG. 24 illustrates at 2400 a two-dimensional extension in which the emission times of measurement pulses are scrambled in accordance with some embodiments of the invention. Four scan lines are shown at 2405 in this example. The scanner system scans lines in a vertical direction as indicated at 2410. Consecutive scan lines are offset in a horizontal (e.g., azimuthal) direction as indicated at 2415. The emission times of pulses within each scan line are shifted in a repetitive pattern indicated by the shifts 1, 2, 3, 4. The emission times of pulses in consecutive scan lines are shifted in a pattern such that the time shift of a given measured distance has no neighboring points with the same time shift, e.g. a point with shift 1 is surrounded by neighboring points having shifts 2, 3 and 4, but not 1. The example of FIG. 24 shows maximization of time shift differences for a signature having four possible time shifts in a signature pattern.

FIG. 25 illustrates at 2500 a two-dimensional extension of signature recognition by neighborhood selection in accordance with some embodiments of the invention. The four scan lines 2405 of FIG. 24 are shown in this example, with scan lines in the vertical direction 2410 offset consecutively in the horizontal direction 2415. In this example, recognition of the pulse emission time signature of a range interval is determined using at least one measured distance of the neighborhood involving another scan line. For example, measured distance 2505 having an emission time shift 3 is compared with one or more neighboring measured distances 2510, 2515 of an adjacent scan line having, e.g., emission time shifts 4 and 1, respectively, for purposes of recognizing the range interval signature. Measured distance 2505 may also be compared with one or more neighboring measured distances of the same scan line, such as 2520, to identify a two-dimensional signature pattern of emission time shifts.

FIG. 26 describes at 2600 an interval assignment policy for a two-dimensional extension in accordance with some embodiments of the invention. In this example, each measured distance is compared with at least one other measured distance in its neighborhood. Each comparison ends with assignment of the evaluated measured distance to a range interval, e.g., interval 1 or interval 0. A strategy of collaboration of the interval assignments brings a resulting assignment for the evaluated measured distance.

For example a policy of resulting interval assignment can be one of: assignment to the furthest range interval, assignment to the range interval to which the most measured distance points are assigned, the median of range interval assignments, and a weighting based on the angular distance of the neighbor from the evaluated measured distance point.

FIG. 27 shows a method in accordance with some embodiments of the invention, of measuring distance from an instrument origin to each of a plurality of points in an environment. Laser pulses are emitted at 2705 along a measurement axis at successive displacements about the instrument origin, the emission time of each emitted laser pulse having a time shift relative to nominal fixed rate, where the time shift corresponds to an index of a repetitive sequential pattern. Received pulses are detected at 2710 at respective arrival times. In general, received pulses are detected continuously as the emitted pulses are being emitted, each received pulse corresponding to one of the emitted pulses. The received pulses are processed at 2715.

For each received pulse, a current apparent distance is determined at 2720 using the arrival time of the received pulse and the emission time of the latest emitted pulse. At 2725 a measured delta distance between the current apparent distance and a previous apparent distance is calculated. At 2730, a range interval is assigned by comparing the measured delta distance with at least one expected delta distance, where each expected delta distance is synchronized with the index of the latest emitted pulse. At 2735, the current apparent distance is defined to be a true measured distance for any received pulse assigned to a first time interval (e.g., interval 0), and is otherwise defined to be a false measured distance. The true measured distances are stored at 2740.

In some embodiments, the false measured distances are discarded.

In some embodiments, the false measured distances are identified as invalid. For example, the false measured distances are flagged as invalid or are set to a zero value or are set to an invalid value.

In some embodiments, each of a plurality of false measured distances is corrected to obtain a true measured distance by adjusting for the time shift and adding an offset corresponding to the assigned range interval. In some embodiments, adjusting for the time shift comprises subtracting an expected delta distance from the current measured distance.

In some embodiments, at least one rule is applied to redefine at least one true measured distance as a false measured distance. In some embodiments, the rule is based on neighboring measured distances. In some embodiments the rule is based on whether a prior measured distance is missing and a subsequent measured distance is assigned to a range interval other than the first range interval. In some embodiments the rule is based on whether a prior measured distance and a subsequent measured distance is assigned to a range interval. In some embodiments the rule is based on a missing measured distance where a subsequent measured distance is assigned to a range interval.

In some embodiments, the successive displacements about the instrument origin are at least one of angular and linear.

In some embodiments, the repetitive sequential pattern has a fixed number of time-shift steps, each step associated with an index. In some embodiments, the index corresponds to a unique expected delta distance for each range interval. In some embodiments, each expected delta distance corresponds to a time difference between a fixed number of steps of the repetitive sequential pattern.

FIG. 28 schematically shows a system 2800 in accordance with some embodiments of the invention, for measuring distance from an instrument origin to each of a plurality of points in an environment. System 2800 includes a laser source 2805, a reception unit 2810, a system control unit 2815, and memory 2820. Laser source 2805 is controlled by a laser controller 2825 to emit laser pulses along a measurement axis 2830 at successive displacements 2835 about an instrument origin 2840. The emission time of each emitted laser pulse has a time shift relative to nominal fixed rate, such as in the example of FIG. 6B. The time shift corresponds to an index of a repetitive sequential pattern, such as in the example of FIG. 6C.

Reception unit 2810 detects received pulses at respective arrival times. Control unit 2815 includes a processor 2845 programmed to process each received pulse as in FIG. 27. For each received pulse, processor 2845 is operative to: determine a current apparent distance using the arrival time of the received pulse and the emission time of the latest emitted pulse, calculate a measured delta distance between the current apparent distance and a previous apparent distance, assign a range interval by comparing the measured delta distance with at least one expected delta distance, where each expected delta distance is synchronized with the index of the latest emitted pulse, define the current apparent distance to be a true measured distance for any received pulse assigned to a first time interval, and define the current apparent distance to be a false measured distance for any received pulse not assigned to the first time interval. Memory 2820 is operative to store the true measured distances.

Programmed processor 2845 is operative to perform one or more additional functions, in accordance with some embodiments of the invention. In some embodiments, processor 2845 is operative to discard the false measured distances. In some embodiments, processor 2845 is operative to identify the false measured distances as invalid.

In some embodiments, programmed processor 2845 is operative to correct each of a plurality of false measured distances to obtain a true measured distance by adjusting for the time shift and adding an offset corresponding to the assigned range interval. In some embodiments, adjusting for the time shift comprises subtracting an expected delta distance from the current measured distance.

In some embodiments, programmed processor 2845 is operative to identify a pattern of successive definitions of current apparent distances, and apply a rule to redefine at least one true measured distance as a false measured distance.

In some embodiments, the programmed processor 2845 is operative to determine the successive definitions along a scan line and/or between adjacent scan lines. In some embodiments, the successive displacements about the instrument origin are angular and/or linear.

In some embodiments, the programmed processor 2845 is external to control unit 2815. In some embodiments, one or more of the functions attributed to programmed processor 2845 in the above description are carried out by one or more other programmed processors within the scanner system and/or external to the scanner system.

In some embodiments, the repetitive sequential pattern has a fixed number of time-shift steps, each step associated with an index, e.g., as in the example of FIG. 6B and FIG. 6C. In some embodiments, the index corresponds to a unique expected delta distance for each range interval. In some embodiments, each expected delta distance corresponds to a time difference between a fixed number of steps of the repetitive sequential pattern.

The principle of scrambling the point cloud for distances above the ambiguity limit by having an irregular pulse repetition rate has been here described with two biases introduced (±0.03 μs equates to ±5 m in the example of FIG. 6B). Some embodiment of the invention use more complex bias patterns. In some embodiments a larger number of fixed biases is used (e.g., with 3 biases: −5 m, 0 m, +5 m). In some embodiments, random biases in a limited range (e.g., random between −5 m and +5 m) are used. Whatever bias pattern is used, the table of delta distances is adapted to identify the bias pattern applied to the emitted laser pulses so that the received pulses can be assigned to their respective intervals.

A pattern with more than two biases is used for return pulses coming from multiple ambiguity intervals. Measured points in the third interval (interval 2, e.g., for the range 300 m-450 m) would appear unscrambled if a pattern with only two biases were used. In general, to identify points that could potentially come from a number of ambiguity intervals, the number of biases is equal to or greater than the number of ambiguity intervals. Pulse power and signal-to-noise ratio of the scanner system can limit the number of ambiguity intervals. In some embodiments, a scanner system having a minimum of three biases is capable of measuring over three ambiguity intervals: no ambiguity [0 m-150 m], ambiguity interval 1 [150 m-300 m] and ambiguity interval 2 [300 m-450 m].

In accordance with some embodiments, measured distances beyond the ambiguity limit are scrambled by applying a slight irregularity to the pulse emission rate. For a consistent surface (such as a vertical wall of a building), their relative distances follow a pattern similar to the pattern of the biases of this irregularity. The pattern (a relative "signature") can be found by analyzing a group of consecutive points on a scan line or a group of neighboring points in a scan. For real-time implementation (i.e. at the moment of scanning), it is not realistic to analyze points from multiple scanlines; thus, consecutive points from the same scanline are analyzed. A post-processing stage based on neighboring points in a completed scan can be implemented if a stronger filtering is required.

Each bias applied to the pulse emission rate results in a corresponding bias in the measured distance. Emission time biases are generated so they are known and correspond to distance biases. A distance biases pattern can be easily computed based on the selected emission biases pattern. Measured distances are then compared to the distance biases pattern to check if they are correlated. If they are, measured distance is above the ambiguity interval limit.

In a real world scenario, consecutive measured distances are not equal. That would describe a shape like a perfect sphere centered on the scanner location. So a direct correlation of the measured distances and the distance biases pattern are easy to recognize is not ideal. For a realistic scenario, the derivative of the measured distances is compared with the derivative of the distance biases pattern. Comparison is made between the sum of measured distance and a number of previous distances, and the sum of the corresponding distance biases. A threshold is then used on this comparison to identify points likely to be from distances above the ambiguity interval limit.

This comparison allows distance measurements at a range greater than the distance ambiguity interval to be identified if they describe a consistent geometry with their neighbors. A set of points not showing a certain consistency (such as trees) will not be completely identified.

The proposed approach is suitable for even longer range, such as a mining version of a scanner; mobile (terrestrial) and aerial scanning could also benefit from it.

Those skilled in the art will realize that the detailed description of embodiments of the present invention is illustrative only and is not intended to be in any way limiting. Other embodiments of the present invention will readily suggest themselves to such skilled persons having the benefit of this disclosure.

Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be readily implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented in part on a data processing computer such as a portable computing device, personal computer, workstation computer, mainframe computer, or high-performance server running an operating system such as Microsoft® Windows®, available from Microsoft Corporation of Redmond, Wash., or various versions of the Unix operating system such as Linux available from a number of vendors, or a version of the Android operating system. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Some or all of the above-described methods and their embodiments may be implemented in part by execution of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on apparatus already in the field, i.e. a computer program which is delivered to the field as a computer program product. This applies to each of the above-described methods and apparatuses.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of measuring distance from an instrument origin to each of a plurality of points in an environment comprising:
   emitting laser pulses along a measurement axis at successive displacements about the instrument origin, an emission time of each emitted laser pulse having a time shift relative to nominal fixed rate, where the time shift corresponds to an index of a repetitive sequential pattern;
   detecting received pulses at respective arrival times;
   for each received pulse:
      determining a current apparent distance using the arrival time of a received pulse and the emission time of a latest emitted pulse;
      calculating a measured delta distance between the current apparent distance and a previous apparent distance;
      assigning a range interval by comparing the measured delta distance with at least one expected delta distance, where each expected delta distance is synchronized with the index of the repetitive sequential pattern of the latest emitted pulse;
      defining the current apparent distance to be a true measured distance for any received pulse assigned to a first range interval; and
      defining the current apparent distance to be a false measured distance for any received pulse not assigned to the first range interval;
   storing each true measured distance; and
   for each false measured distance:
      determining the false measured distance satisfies a point tagging criteria;
      thereafter, assigning the first range interval associated with the true measured distance to the false measured distance; and
      storing the false measured distance assigned to the first range interval with the true measured distances.

2. The method of claim 1 wherein the point tagging criteria comprises determining the false measured distance precedes at least one true measured distance.

3. The method of claim 1 wherein the point tagging criteria comprises determining the false measured distance was received subsequent to a first true measured distance.

4. The method of claim 3 wherein the point tagging criteria further comprises determining the false measured distance precedes a second true measured distance.

5. The method of claim 1 wherein the point tagging criteria comprises:
   determining the false measured distance is one false measured distance of a plurality of consecutive false measured distances;
   determining the plurality of consecutive false measured distances is preceded by a first true measurement and succeeded by a second true measurement;
   determining a total number of false measured distances in the plurality of consecutive false measured distances; and
   determining the total number of false measured distances is less than a threshold number of false measured distances.

6. The method of claim 1 wherein the point tagging criteria comprises determining the false measured distance is within a threshold displacement along the measurement axis.

7. The method of claim 1 further comprising:
   storing the current apparent distance for each received pulse in one or more scan lines; wherein each scan line corresponds to a first scan direction, and wherein adjacent scan lines correspond to a second scan direction; and
   determining the false measured distance in a first scan line satisfies the point tagging criteria using an adjacent scan line.

8. The method of claim 1, wherein the repetitive sequential pattern has a fixed number of time-shift steps, each step associated with an index.

9. The method of claim 1, wherein the index corresponds to a unique expected delta distance for each range interval.

10. The method of claim 1, wherein each expected delta distance corresponds to a time difference between a fixed number of steps of the repetitive sequential pattern.

11. Apparatus for measuring distance from an instrument origin to each of a plurality of points in an environment, comprising:
   a laser source to emit laser pulses along a measurement axis at successive displacements about the instrument origin, an emission time of each emitted laser pulse having a time shift relative to nominal fixed rate, where the time shift corresponds to an index of a repetitive sequential pattern,
   a reception unit to detect received pulses at respective arrival times,
   at least one control unit operative, for each received pulse, to:
      determine a current apparent distance using an arrival time of the received pulse and an emission time of a latest emitted pulse,
      calculate a measured delta distance between the current apparent distance and a previous apparent distance, assign a range interval by comparing the measured delta distance with at least one expected delta distance, where each expected delta distance is synchronized with the index of the repetitive sequential pattern of the latest emitted pulse, define the current apparent distance to be a true measured distance for any received pulse assigned to a first range interval, define the current apparent distance to be a false measured distance for any received pulse not assigned to the first range interval, wherein for each false measured distance the control unit is operative to:

determine the false measured distance satisfies a point tagging criteria; and thereafter, assign the first range interval associated with the true measured distance to the false measured distance; and a memory operative to store the true measured distances and the false measured distances assigned to the first range interval.

12. The apparatus of claim 11 wherein the point tagging criteria comprises determining the false measured distance precedes at least one true measured distance.

13. The apparatus of claim 11 wherein the point tagging criteria comprises determining the false measured distance was received subsequent to a first true measured distance.

14. The apparatus of claim 13 wherein the point tagging criteria further comprises determining the false measured distance precedes a second true measured distance.

15. The apparatus of claim 11 wherein the point tagging criteria comprises:

determining the false measured distance is one false measured distance of a plurality of consecutive false measured distances;

determining the plurality of consecutive false measured distances is preceded by a first true measurement and succeeded by a second true measurement;

determining a total number of false measured distances in the plurality of consecutive false measured distances; and determining the total number of false measured distances is less than a threshold number of false measured distances.

16. The apparatus of claim 11 wherein the point tagging criteria comprises determining the false measured distance is within a threshold displacement along the measurement axis.

17. The apparatus of claim 11 further comprising:

storing the current apparent distance for each received pulse in one or more scan lines; wherein each scan line corresponds to a first scan direction, and wherein adjacent scan lines correspond to a second scan direction; and determining the false measured distance in a first scan line satisfies the point tagging criteria using an adjacent scan line.

18. The apparatus of claim 11 wherein the repetitive sequential pattern has a fixed number of time-shift steps, each step associated with an index.

19. The apparatus of claim 11, wherein the index corresponds to a unique expected delta distance for each range interval.

20. A method of measuring distance from an instrument origin to each of a plurality of points in an environment comprising:

emitting laser pulses along a measurement axis, wherein an emission time of each emitted laser pulse has a time shift relative to nominal fixed rate;

detecting received pulses at respective times;

determining a measured distance for each received pulse;

storing the measured distance in a scan line position; and for each measured distance:

determining the measured distance is within a threshold number of scan line positions of a previous measured distance assigned to a range interval, wherein the range interval is assigned by:

comparing successively measured distances to obtain delta distances; and comparing the obtained delta distances with expected delta distances; and thereafter, assigning the measured distance to the range interval.

* * * * *